United States Patent
Jang et al.

(10) Patent No.: US 11,893,272 B2
(45) Date of Patent: Feb. 6, 2024

(54) MEMORY STORAGE DEVICE, METHOD FOR OPERATING THE STORAGE DEVICE AND METHOD FOR OPERATING A HOST DEVICE

(71) Applicant: Samsung Electronics Co., Ltd., Suwon-si (KR)

(72) Inventors: Hye Jeong Jang, Hwaseong-si (KR); Min Cheol Kwon, Yongin-si (KR); Eun Joo Oh, Hwaseong-si (KR); Sung Kyun Lee, Seongnam-si (KR); Sang Won Jung, Busan (KR); Young Rae Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/559,011

(22) Filed: Dec. 22, 2021

(65) Prior Publication Data
US 2022/0283734 A1     Sep. 8, 2022

(30) Foreign Application Priority Data
Mar. 4, 2021   (KR) .................... 10-2021-0028597

(51) Int. Cl.
*G06F 3/06* (2006.01)
(52) U.S. Cl.
CPC ............ *G06F 3/0656* (2013.01); *G06F 3/064* (2013.01); *G06F 3/0619* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 6,208,999 B1 * | 3/2001 | Spilo | G06F 11/1435 |
| 6,438,661 B1 * | 8/2002 | Beardsley | G06F 11/1435 |
| | | | 711/144 |

(Continued)

FOREIGN PATENT DOCUMENTS

KR       101676175 B1    11/2016

OTHER PUBLICATIONS

Anonymous, "NVM Express Base Specification Revision 1.4a", Mar. 9, 2020, pp. 1-405, XP055878018, Retrieved from the Internet: URL:https://nvmexpress.org/wp-content/uploads/NVM-Express-1_4a-2020.03.09-Ratified.pdf [retrieved on Jan. 12, 2022].

(Continued)

*Primary Examiner* — Michael Alsip
(74) *Attorney, Agent, or Firm* — Muir Patent Law, PLLC

(57) ABSTRACT

A memory storage device is capable of improving reliability of a memory system. The memory storage device comprises a memory controller, and a non-volatile memory connected to the memory controller. A method includes receiving, by the memory controller, a command from a host device, the command requesting lost LBA (logical block address) information resulting from a system shutdown of the memory storage device, in response to the command, providing, by the memory controller, the lost LBA information, and receiving, by the memory controller, recovered data corresponding to the lost LBA information, wherein the lost LBA information includes at least one of the number of LBAs lost by system shutdown, an LBA list lost by system shutdown, and deletion of a previous LBA list lost by system shutdown.

16 Claims, 22 Drawing Sheets

(56) References Cited

U.S. PATENT DOCUMENTS

| | | | |
|---|---|---|---|
| 9,639,423 B2 | 5/2017 | Adler et al. | |
| 10,102,146 B2 | 10/2018 | Virajamangala et al. | |
| 10,585,764 B2 | 3/2020 | Boden et al. | |
| 10,642,531 B2 | 5/2020 | Song et al. | |
| 10,824,518 B2 | 11/2020 | Kim et al. | |
| 2009/0172466 A1* | 7/2009 | Royer | G06F 11/1064 |
| | | | 714/E11.055 |
| 2019/0042414 A1 | 2/2019 | Juenemann et al. | |
| 2019/0146879 A1* | 5/2019 | Ben Dayan | G06F 11/1464 |
| | | | 714/15 |
| 2019/0347015 A1* | 11/2019 | Luo | G11C 16/3459 |

OTHER PUBLICATIONS

European Search Report dated Jul. 20, 2022 by the European Patent Office for corresponding patent application EP 22159553.1.
Office Action dated Aug. 1, 2022 by the European Patent Office for corresponding patent application EP 22159553.1.

* cited by examiner

FIG. 15

| Value | Description |
|---|---|
| 00h to 03h | Reserved |
| 04h | Lost LBA List Created: Controller has created 'Lost LBA List' due to the recent System Shutdown. |
| 05h | Previous Lost LBA List Discarded: The previous 'Lost LBA List' has been discarded by System Shutdown. |
| 06h | Lost LBA List Created and Previous Lost LBA List Discarded: Controller has created 'Lost LBA List' and the previous 'Lost LBA List' has been discarded due to recent System Shutdown. |
| 07h | Performance Monitoring Filtered: |
| 08h to FFh | Reserved |

FIG. 16

| Log Identifier | O/M | Description |
|---|---|---|
| 00h | | Reserved |
| 01h | M | Error Information |
| 02h | M | SMART / Health Information |
| 03h | M | Firmware Slot Information |
| 04h | O | Changed Namespace List |
| 05h | O | Commands Supported and Effects |
| 06h | O | Device Self-test |
| 07h | O | Telemetry Host-Initiated |
| 08h | O | Telemetry Controller-Initiated |
| 09h - 6Fh | | Reserved |
| 70h | | Discovery (refer to the NVMe over Fabrics Specification) |
| 71h - 7Fh | | Reserved for NVMe over Fabrics |
| 80h - BFh | | I/O Command Set specific |
| C0h - FFh | | Get Log Page |

O/M : O = Optional, M = Mandatory

FIG. 17

| Bytes | Description |
|---|---|
| 03:00 | Number of Ranges |
| 04:04 | Previous Lost LBA List has been Discarded |
| 15:05 | Reserved |
| 31:16 | Range 0: Contains the information of Lost LBA List Range 0 |
| 47:32 | Range 0: Contains the information of Lost LBA List Range 1 |
| ..... | |
| N*16+15 : N*16 | Range 0: Contains the information of Lost LBA List Range N-1 |

FIG. 20

| Bytes | Description |
|---|---|
| 07:00 | Descriptor Starting LBA (DSLBA): This field specifies the 64-bit address of the first logical block of the LBA range for which this LBA Status Descriptor reports LBA status. |
| 11:08 | Number of Logical Blocks (NLB): This field contains the number of contiguous logical blocks reported in this LBA Status Descriptor. The controller should return the largest aggregated possible value in this field. This is a 0's based value. |
| 12 | Reserved |
| 13 | Status: This field contains additional status about this LBA range.<br><br>| Bits | Definition |<br>|---|---|<br>| 7:2 | If set to '03', this LBA range describes LBAs are lost due to System Shutdown. |<br>| 1 | If set to '1', this LBA range describes LBAs written with a Write Uncorrectable command.<br>If cleared to '0', this LBA range may or may not describe LBAs written with a Write Uncorrectable command. |<br>| 0 | If set to '1', a read, verify, or compare command to each LBA reported in this LBA Status Descriptor may result in a command completion with Unrecovered Read Error status.<br>If cleared to '0', the controller has not detected that a read, verify, or compare command to each LBA reported in this LBA Status Descriptor may result in a command completion with Unrecovered Read Error status. |
| 15:14 | Reserved |

MEMORY STORAGE DEVICE, METHOD FOR OPERATING THE STORAGE DEVICE AND METHOD FOR OPERATING A HOST DEVICE

This application claims priority from Korean Patent Application No. 10-2021-0028597 filed on Mar. 4, 2021 in the Korean Intellectual Property Office, the disclosure of which is incorporated herein by reference in its entirety.

BACKGROUND

1. Field of the Invention

The present disclosure relates to a memory storage device including a non-volatile memory, a method for operating the memory storage device, and a method for operating a host device.

2. Description of the Related Art

Semiconductor memory devices include volatile memory devices and non-volatile memory devices. The volatile memory devices have fast read and write speeds, but may lose their stored contents when powered off. In contrast, since the non-volatile memory devices preserve their stored contents even when powered off, the non-volatile memory devices are used to store contents that need to be retained, irrespective of supply of power.

For example, the volatile memory devices include a static RAM (SRAM), a dynamic RAM (DRAM), a synchronous DRAM (SDRAM), and the like. The non-volatile memory devices preserve their stored contents even when powered off. For example, the non-volatile memory devices may be classified into a ROM (read only memory), a programmable ROM (PROM), an electrically programmable ROM (EPROM), an electrically erasable and programmable ROM (EEPROM), a flash memory, a phase change RAM (PRAM), a magnetic RAM (MRAM), a resistive RAM (RRAM), a ferroelectric RAM (FRAM), and the like. The flash memory may be classified into a NOR type flash memory and a NAND type flash memory.

In particular, the flash memory device has an advantage that may be implemented as a device such as a highly integrated auxiliary mass storage device compared to a general EEPROM.

Various memory systems are produced using a flash memory. The memory systems may store data in or read data from the flash memory through a protocol.

Recently, an amount of data buffered in a write buffer tends to increase in a multi-stream environment of the flash memory. Because data may be lost when dumping the data buffered in the write buffer, it is important to study a method that may further improve the reliability of the memory system.

SUMMARY

Aspects of the present disclosure provide a memory storage device capable of improving reliability of a memory system.

Aspects of the present disclosure also provide a method for operating a memory storage device capable of improving the reliability of the memory system.

Aspects of the present disclosure also provide a method for operating a host device capable of improving the reliability of the memory system.

However, aspects of the present disclosure are not restricted to the ones set forth herein. These and other aspects of the present disclosure will become more apparent to one of ordinary skill in the art to which the present disclosure pertains by referencing the detailed description of the present disclosure given below.

According to an embodiment of the present disclosure, a memory storage device comprises a memory controller, and a non-volatile memory connected to the memory controller. A method includes receiving, by the memory controller, a command from a host device, the command requesting lost LBA (logical block address) information resulting from a system shutdown of the memory storage device, in response to the command, providing, by the memory controller, the lost LBA information, and receiving, by the memory controller, recovered data corresponding to the lost LBA information, wherein the lost LBA information includes at least one of the number of LBAs lost by system shutdown, an LBA list lost by system shutdown, and deletion of a previous LBA list lost by system shutdown.

According to the aforementioned and other embodiments of the present disclosure, a method for operating a host device, includes transmitting a command for requesting lost LBA information resulting from system shutdown of a memory storage device to the memory storage device, receiving the lost LBA information from the memory storage device in response to the command, generating recovery data on the basis of the lost LBA information received from the memory storage device, and providing the recovery data to the memory storage device, wherein the recovery data includes data from the host device corresponding to the lost LBA information.

According to the aforementioned and other embodiments of the present disclosure, a method for operating a memory storage device includes transmitting from the memory storage device an AER command (Asynchronous Event Request command) indicating whether lost LBA information resulting from system shutdown of the memory storage device has been created, and receiving a command requesting lost LBA information from the memory storage device in response to the AER command.

According to the aforementioned and other embodiments of the present disclosure, a method for operating a memory storage device comprises receiving a read request signal from an external device, providing an uncorrectable error signal from the memory storage device in response to the read request signal, receiving a command for requesting LBA status information from the external device, providing lost status information resulting from system shutdown, in response to the command for requesting the LBA status information, receiving recovered data in response to the lost status information due to the system shutdown, receiving a command for requesting lost LBA information resulting from the system shutdown of the memory storage device from the external device, and providing the lost LBA information from the memory storage device in response to the command.

BRIEF DESCRIPTION OF THE DRAWINGS

The above and other embodiments and features of the present disclosure will become more apparent by describing in detail embodiments thereof with reference to the attached drawings, in which:

FIGS. 14 to 17 are diagrams for explaining the operation of the host and the memory storage device of FIGS. 12 and 13, according to some embodiments.

FIG. 20 is a diagram for explaining the operation of the host and the memory storage device of FIGS. 18 and 19, according to some embodiments.

DETAILED DESCRIPTION OF THE EMBODIMENTS

Hereinafter, embodiments according to the technical idea of the present disclosure will be described referring to the accompanying drawings.

Hereinafter, an electronic device 1 including a host 100, a memory controller 200, and a non-volatile memory 300 will be described referring to FIGS. 1 to 3.

Figure 1:
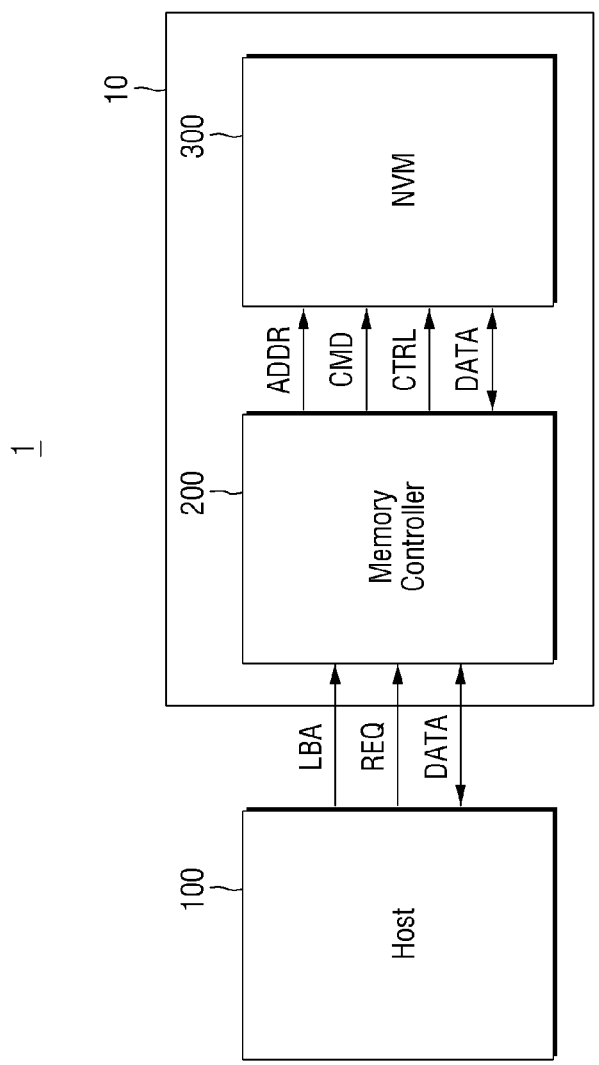
FIG. 1 is a block diagram for explaining the electronic device according to some embodiments.

FIG. 1 is a block diagram for explaining the electronic device according to some embodiments. FIG. 2 is a block diagram for explaining the memory controller of FIG. 1. FIG. 3 is a block diagram for explaining the non-volatile memory of FIG. 1.

Referring to FIG. 1, the electronic device 1 may include a host 100 and a memory storage device 10. The host 100 and the memory storage device 10 may be electrically connected to each other. The host 100 may provide the memory storage device 10 with a logical block address LBA and a request signal REQ, and the host 100 and the memory storage device 10 may send and receive the data DATA. For example, the host 100 may be connected to the memory controller 200.

The host 100 may include, for example, a personal computer (PC), a laptop, a mobile phone, a smart phone, a tablet PC, a server, or the like.

The memory storage device 10 may include a memory controller 200 and a non-volatile memory 300. The memory storage device 10 may be integrated as a single semiconductor device or electronic device. For example, the memory storage device 10 may be or may include an embedded UFS (Universal Flash Storage) memory device, an eMMC (embedded Multi-Media Card), an SSD (Solid Status Drive), and the like. Further, for example, the memory storage device 10 may include a detachable UFS memory card, a CF (Compact Flash), an SD (Secure Digital), a Micro-SD (Micro Secure Digital), a Mini-SD (Mini Secure Digital), an xD (extreme Digital), a memory stick or the like. When the memory storage device 10 is an SSD, the memory storage device 10 may be a device that complies with NVMe (non-volatile memory express) standard.

The non-volatile memory 300 may include a NAND flash memory. However, the embodiments according to the technical idea of the present disclosure are not limited thereto, and the non-volatile memory 300 may include a NOR flash memory, or may include a resistive memory, such as a PRAM (Phase-change RAM), a MRAM (Magneto resistive memory RAM), a FeRAM (Ferroelectric RAM), and a RRAM (Resistive RAM).

The memory controller 200 may be connected to the non-volatile memory 300 to control the non-volatile memory 300. For example, the memory controller 200 may provide an address ADDR, a command CMD, a control signal CTRL, or the like to the non-volatile memory 300, in response to a logical block address LBA, a request signal REQ and the like received from the host 100. Accordingly, the memory controller 200 may provide signals to the non-volatile memory 300 and perform a control to write data to the non-volatile memory 300 or read data from the non-volatile memory 300. Further, the memory controller 200 and the non-volatile memory 300 may send and receive the data DATA.

Figure 2:
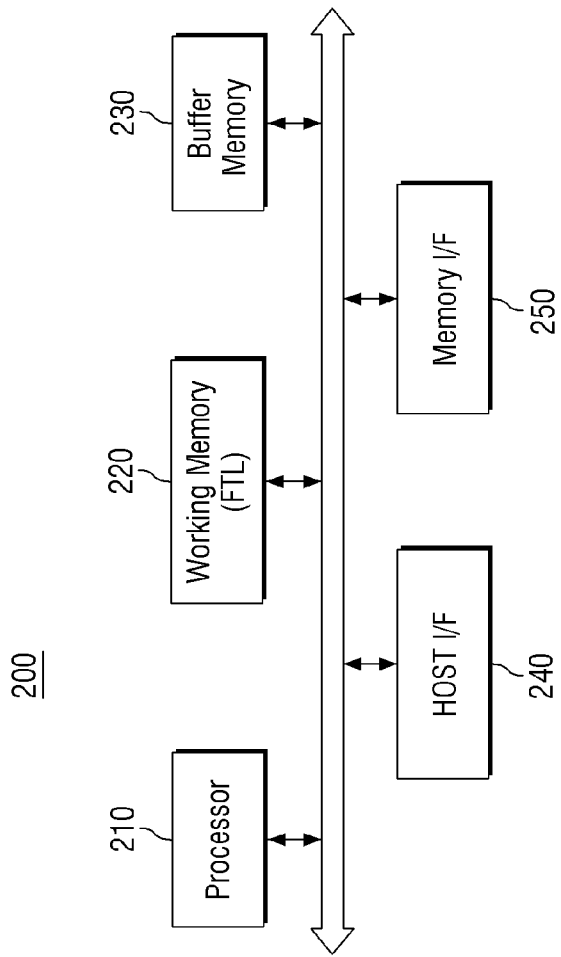
FIG. 2 is a block diagram for explaining the memory controller of FIG. 1 according to some embodiments.

Referring to FIG. 2, the memory controller 200 may include a processor 210, a working memory 220, a buffer memory 230, a host interface 240, a memory interface 250, and the like.

The processor 210 may include a central processing unit (CPU), a controller, an application specific integrated circuit (ASIC), and the like. The processor 210 may control the overall operation of the memory controller 200. The processor 210 may operate firmware loaded into the working memory 220 to control the memory controller 200.

The host interface 240 may transmit and receive packets to and from the host 100. Packets transmitted from the host 100 to the host interface 240 may include a command, data to be written in the non-volatile memory 300, or the like. The packets transmitted from the host interface 240 to the host 100 may include a response to the command, data read from the non-volatile memory 300 or the like.

The memory interface 250 may transmit the data to be written on the non-volatile memory 300 to the non-volatile memory 300 or receive the read data from the non-volatile memory 300. Such a memory interface 250 may be implemented to comply with standard protocols such as Toggle or ONFI, for example.

The working memory 220 may include a flash transition layer (FTL). The flash translation layer may include system software for managing the write, read and erase operations of the non-volatile memory 300. In some embodiments, the flash translation layer may include firmware. The flash translation layer may be loaded into the working memory 220. The firmware of the flash translation layer may be executed by the processor 210.

The flash translation layer of the working memory 220 may perform various functions such as address mapping, wear-leveling, and garbage collection. The address mapping operation is an operation of changing a logical address received from a host into a physical address which is used for actually storing the data in the non-volatile memory 300. The wear-leveling is a technique for ensuring that blocks in the non-volatile memory 300 are used uniformly to prevent an excessive degradation of a particular block, and may be implemented, for example, through a firmware technique of balancing the erasure counts of the physical blocks. The garbage collection is a technique for ensuring an available capacity in the non-volatile memory 300 through a way of copying the valid data of the block to a new block and then erasing the existing block.

The buffer memory 230 may store code data required for the initial booting of the memory storage device 10. The buffer memory 230 may buffer the logical block address LBA, the request signal REQ, the data DATA, the command, and the like that are sent from the host 100. The signals buffered in the buffer memory 230 may be sent to the non-volatile memory 300 through the memory interface 250 and may be used. For example, the data DATA buffered in the buffer memory 230 may be programmed in the non-volatile memory 300.

Figure 3:
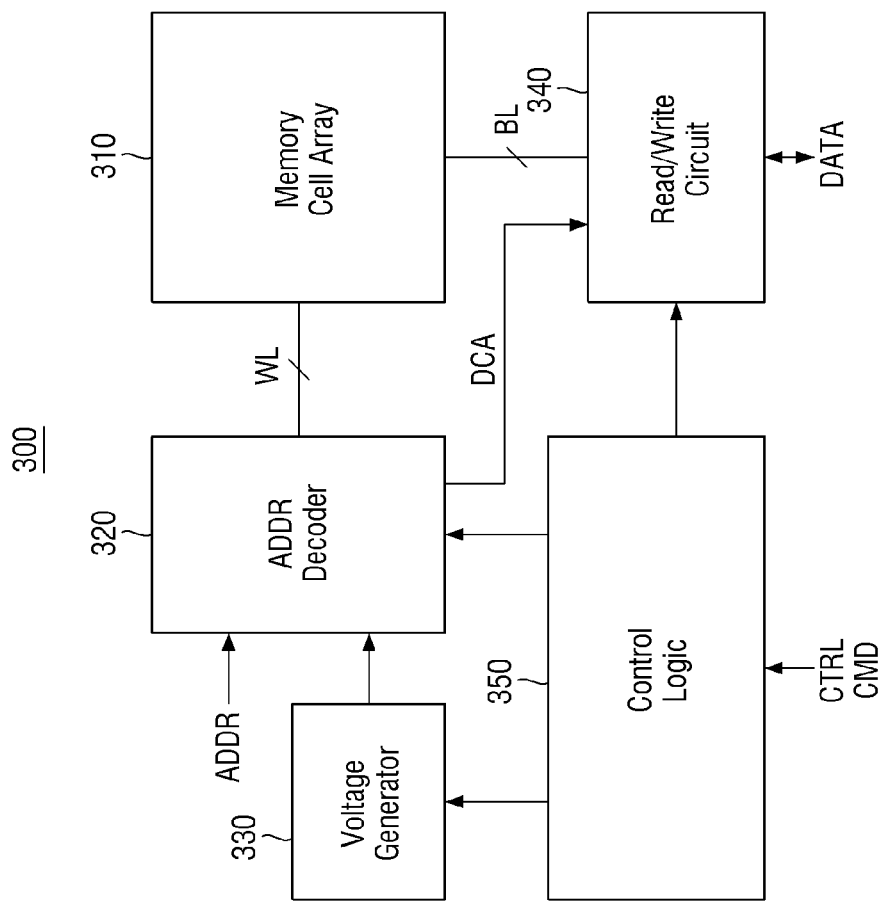
FIG. 3 is a block diagram for explaining the non-volatile memory of FIG. 1 according to some embodiments.

Referring to FIG. 3, the non-volatile memory 300 may include a memory cell array 310, an address decoder 320, a voltage generator 330, a read/write circuit 340, a control logic 350, and the like.

The memory cell array 310 may be connected to the address decoder 320 through word lines WL. The memory cell array 310 may be connected to the read/write circuit 340 through bit lines BL. The memory cell array 310 may include a plurality of memory cells. For example, the memory cells arranged in a row direction may be connected to the word line WL. For example, memory cells arranged in a column direction may be connected to the bit line BL.

The address decoder 320 may be connected to the memory cell array 310 through the word line WL. The address decoder 320 may operate in response to the control of the control logic 350. The address decoder 320 may receive the address ADDR from the memory controller 200. The address decoder 320 may receive the voltage required for the operations such as program and read from the voltage generator 330.

The address decoder 320 may decode the row address of the received address ADDR. The address decoder 320 may select the word line WL, using the decoded row address. The decoded column address DCA may be provided to the read/write circuit 340. For example, the address decoder 320 may include a row decoder, a column decoder, an address buffer, and the like.

The voltage generator 330 may generate the voltage required for an access operation under the control of the control logic 350. For example, the voltage generator 330 may generate a program voltage and a program verification voltage required to perform the program operation. For example, the voltage generator 330 may generate the read voltages required to perform the read operation, the erase voltage and the erase verification voltage required to perform the erase operation, and the like. The voltage generator 330 may also provide the address decoder 320 with the voltage required to perform each operation.

The read/write circuit 340 may be connected to the memory cell array 310 through the bit line BL. The read/write circuit 340 may send and receive the data DATA to and from the memory controller 200. The read/write circuit 340 may operate in response to the control of the control logic 350. The read/write circuit 340 may provide the decoded column address DCA from the address decoder 320. The read/write circuit 340 may select the bit line BL, using the decoded column address DCA.

For example, the read/write circuit 340 may program the received data DATA into the memory cell array 310. The read/write circuit 340 may read the data from the memory cell array 310, and provide the read data to the external device (for example, the memory controller 200). For example, the read/write circuit 340 may include configurations such as a detection amplifier, a write driver, a column selection circuit and a page buffer.

The control logic 350 may be connected to the address decoder 320, the voltage generator 330, and the read/write circuit 340. The control logic 350 may control the operation of the non-volatile memory 300. The control logic 350 may operate in response to a control signal CRTL and a command CMD (e.g., a write command, a read command, or the like) provided from the memory controller 200, and may be implemented using logic circuits, for example.

Figure 4:
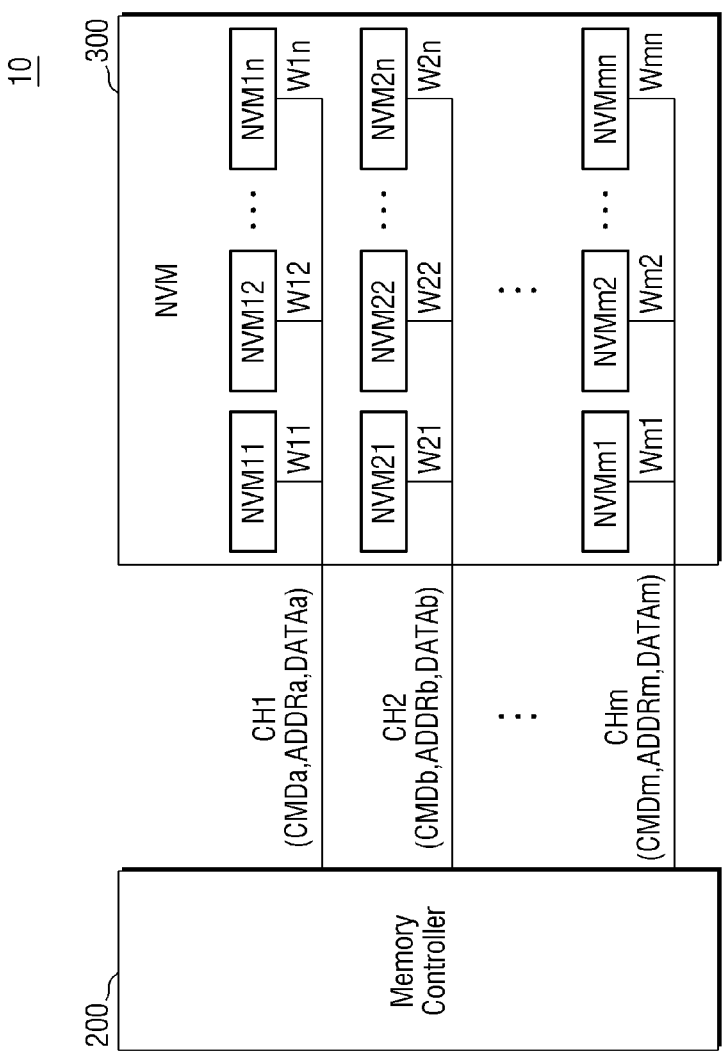
FIG. 4 is a block diagram showing aspects of the memory controller and the non-volatile memory of FIG. 1, according to some embodiments.

FIG. 4 is a block diagram showing aspects of the memory controller and the non-volatile memory of FIG. 1.

Referring to FIG. 4, the memory storage device 10 may include a memory controller 200 and a non-volatile memory 300. The memory storage device 10 may support a plurality of channels CH1 to CHm, and the memory controller 200 and the non-volatile memory 300 may be connected through the plurality of channels CH1 to CHm. For example, the memory storage device 10 may be implemented as a storage device such as an SSD (Solid State Drive). The channels CH1 to CHm may be implemented using various conductive lines and switches (e.g., transistors) connected between the memory storage device 10 and the non-volatile memory 300.

The non-volatile memory 300 may include a plurality of non-volatile memory devices NVM11 to NVMmn. Each of the non-volatile memory devices NVM11 to NVMmn may be connected to one of a plurality of channels CH1 to CHm through a corresponding path. For example, the non-volatile memory devices NVM11 to NVM1n may be connected to a first channel CH1 through paths W11 to W1n, and the non-volatile memory devices NVM21 to NVM2n may be connected to the second channel CH2 through paths W21 to W2n. In an exemplary embodiment, each of the non-volatile memory devices NVM11 to NVMmn may be implemented in any memory unit that may operate in accordance with individual instructions from the memory controller 200. For example, each of the non-volatile memory devices NVM11 to NVMmn may be implemented as a chip or die, but the present disclosure is not limited thereto.

The memory controller 200 may transmit and receive signals to and from the non-volatile memory 300 through the plurality of channels CH1 to CHm. For example, the memory controller 200 may transmit commands CMDa to CMDM, addresses ADDRa to ADDRm, and data DATAa to DATAm to the non-volatile memory 300 through the channels CH1 to CHm or may receive the data DATAa to DATAm from the non-volatile memory 300.

The memory controller 200 may select one of the non-volatile memory devices connected to the channels through each channel, and may transmit and receive signals to and from the selected non-volatile memory device. For example, the memory controller 200 may select the non-volatile memory device NVM11 among the non-volatile memory devices NVM11 to NVM1*n* connected to the first channel CH1. The memory controller 200 may transmit command CMDa, address ADDRa, and data DATAa to the selected non-volatile memory device NVM11 through the first channel CH1 or may receive data DATAa from the selected non-volatile memory device NVM11.

The memory controller 200 may transmit and receive signals in parallel to and from the non-volatile memory 300 through channels different from each other. For example, the memory controller 200 may transmit a command CMDb to the non-volatile memory 300 through the second channel CH2, while transmitting the command CMDa to the non-volatile memory 300 through the first channel CH1. For example, the memory controller 200 may receive data DATAb from the non-volatile memory 300 through the second channel CH2, while receiving the data DATAa from the non-volatile memory 300 through the first channel CH1.

The memory controller 200 may control the overall operation of the non-volatile memory 300. The memory controller 200 may transmit the signal to the channels CH1 to CHm to control each of the non-volatile memory devices NVM11 to NVMmn connected to the channels CH1 to CHm. For example, the memory controller 200 may transmit the command CMDa and the address ADDRa to the first channel CH1 to control selected one among the non-volatile memory devices NVM11 to NVM1*n*.

Each of the non-volatile memory devices NVM11 to NVMmn may operate under the control of the memory controller 200. For example, the non-volatile memory device NVM11 may program the data DATAa in accordance with the command CMDa, the address ADDRa, and the data DATAa provided to the first channel CH1. For example, the non-volatile memory device NVM21 may read the data DATAb in accordance with the command CMDb and the address ADDRb provided to the second channel CH2, and may transmit the read data DATAb to the memory controller 200.

Although FIG. 4 shows that the non-volatile memory 300 communicates with the memory controller 200 through m channels, and the non-volatile memory 300 includes n non-volatile memory devices to correspond to each channel, the number of channels and the number of non-volatile memory devices connected to one channel may be variously changed.

Figure 5:
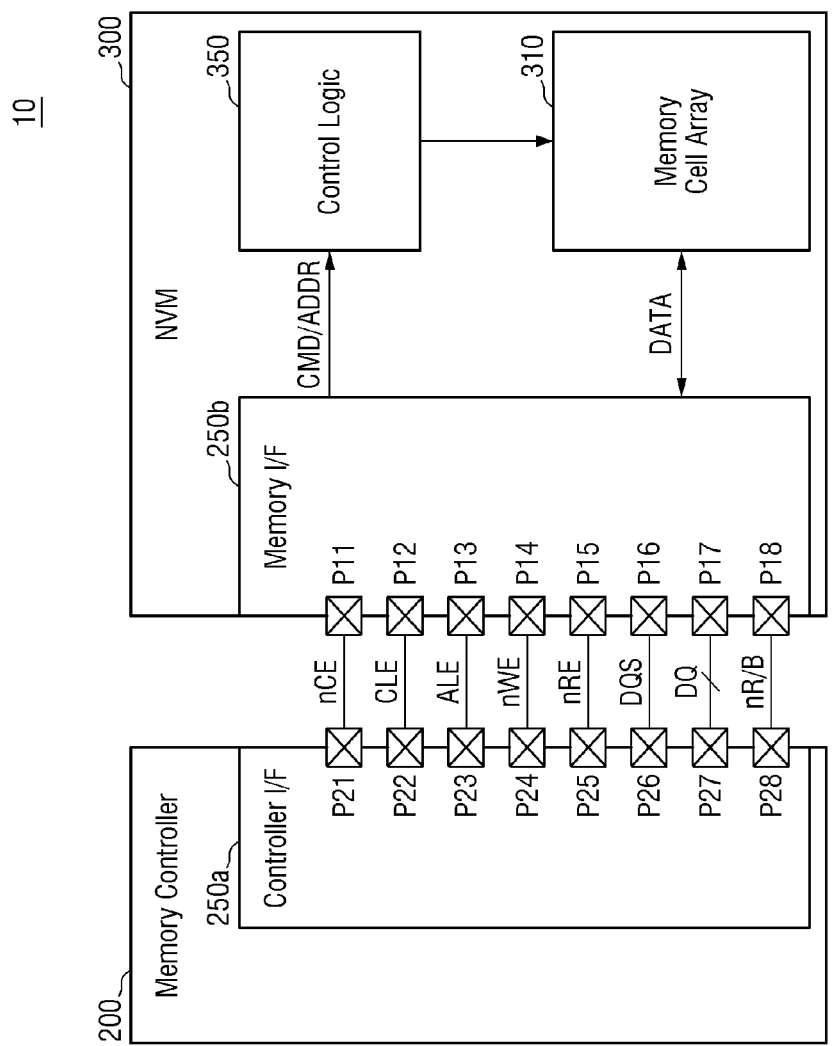
FIG. 5 is a block diagram showing aspects of the memory controller, the memory interface, and the non-volatile memory of FIG. 1, according to some embodiments.

FIG. 5 is a block diagram showing aspects of the memory controller, the memory interface, and the non-volatile memory of FIG. 1. The memory interface 250 of FIG. 1 may include a controller interface circuit 250*a* of FIG. 5.

The non-volatile memory 300 may include first to eighth pins P11 to P18, a memory interface circuit 250*b*, a control logic 350, and a memory cell array 310. Here, the control logic 350 and the memory cell array 310 may be the same as the control logic 350 and the memory cell array 310 of FIG. 3. The various pins described herein may be implemented using conductive terminals, such as conductive bumps, balls, or leads.

The memory interface circuit 250*b* may receive a chip enable signal nCE from the memory controller 200 through a first pin P11. The memory interface circuit 250*b* may transmit and receive signals to and from the memory controller 200 through second to eighth pins P12 to P18 in accordance with the chip enable signal nCE. For example, when the chip enable signal nCE is in an enable status (e.g., a low level), the memory interface circuit 250*b* may transmit and receive signals to and from the memory controller 200 through the second to eighth pins P12 to P18.

The memory interface circuit 250*b* may receive a command latch enable signal CLE, an address latch enable signal ALE, and a write enable signal nWE from the memory controller 200 through the second to fourth pins P12 to P14. The memory interface circuit 250*b* may receive a data signal DQ from the memory controller 200 or transmit the data signal DQ to the memory controller 200 through a seventh pin P17. The command CMD, the address ADDR, and the data DATA may be sent through the data signal DQ. For example, the data signal DQ may be sent through a plurality of data signal lines. In this case, the seventh pin P17 may include a plurality of pins corresponding to the plurality of data signals.

The memory interface circuit 250*b* may acquire the command CMD from the data signal DQ received in an enable section (e.g., a high level status) of the command latch enable signal CLE on the basis of toggle timings of the write enable signal nWE. The memory interface circuit 250*b* may acquire the address ADDR from the data signal DQ received in the enable section (e.g., a high level status) of the address latch enable signal ALE on the basis of the toggle timings of the write enable signal nWE.

In some embodiments, the write enable signal nWE holds a static status (e.g., a high level or a low level) and then may be toggled between the high level and the low level. For example, the write enable signal nWE may be toggled at the section in which the command CMD or the address ADDR is transmitted. Accordingly, the memory interface circuit 250*b* may acquire the command CMD or the address ADDR on the basis of the toggle timings of the write enable signal nWE.

The memory interface circuit 250*b* may receive a read enable signal nRE from the memory controller 200 through the fifth pin P15. The memory interface circuit 250*b* may receive a data strobe signal DQS from the memory controller 200 through a sixth pin P16, or may transmit the data strobe signal DQS to the memory controller 200.

In the data DATA output operation of the non-volatile memory 300, the memory interface circuit 250*b* may receive the read enable signal nRE toggled through the fifth pin P15 before outputting the data DATA. The memory interface circuit 250*b* may create the data strobe signal DQS toggled on the basis of the toggling of the read enable signal nRE. For example, the memory interface circuit 250*b* may create the data strobe signal DQS that starts to toggle after a predetermined delay (e.g., tDQSRE) on the basis of the toggling start time of the read enable signal nRE. The memory interface circuit 250*b* may transmit a data signal DQ including the data DATA on the basis of the toggle timing of the data strobe signal DQS. Accordingly, the data DATA may be arranged at the toggle timing of the data strobe signal DQS and transmitted to the memory controller 200.

In the data DATA input operation of the non-volatile memory 300, when the data signal DQ including the data DATA is received from the memory controller 200, the memory interface circuit 250*b* may receive the data strobe signal DQS toggled together with the data DATA from the memory controller 200. The memory interface circuit 250*b* may acquire the data DATA from the data signal DQ on the basis of the toggle timing of the data strobe signal DQS. For example, the memory interface circuit 250*b* may acquire the data DATA by sampling the data signal DQ at a rising edge and a falling edge of the data strobe signal DQS.

The memory interface circuit 250b may transmit a ready/busy output signal nR/B to the memory controller 200 through an eighth pin P18. The memory interface circuit 250b may transmit the status information of the non-volatile memory 300 to the memory controller 200 through the ready/busy output signal nR/B. When the non-volatile memory 300 is in a busy status (for example, when the internal operations of the non-volatile memory 300 are being performed), the memory interface circuit 250b may transmit the ready/busy output signal nR/B indicating the busy status to the memory controller 200. When the non-volatile memory 300 is in a ready status (i.e., the internal operations of the non-volatile memory 300 are not performed or are completed), the memory interface circuit 250b may transmit the ready/busy output signal nR/B indicating the ready status to the memory controller 200.

For example, while the non-volatile memory 300 reads the data DATA from the memory cell array 310 in response to a page read command, the memory interface circuit 250b may transmit the ready/busy output signal nR/B indicating the busy status (e.g., a low level) to the memory controller 200. For example, while the non-volatile memory 300 programs the data DATA to the memory cell array 310 in response to the program instruction, the memory interface circuit 250b may transmit the ready/busy output signal nR/B indicating the busy status to the memory controller 200.

The control logic circuit 350 may generally control various operations of the non-volatile memory 300. The control logic circuit 350 may receive the command/address CMD/ADDR acquired from the memory interface circuit 250b. The control logic circuit 350 may generate control signals for controlling other components of the non-volatile memory 300 in accordance with the received command/address CMD/ADDR. For example, the control logic circuit 350 may generate various control signals for programing the data DATA in the memory cell array 310 or reading the data DATA from the memory cell array 310.

The memory cell array 310 may store the data DATA acquired from the memory interface circuit 250b under the control of the control logic circuit 350. The memory cell array 310 may output the stored data DATA to the memory interface circuit 250b under the control of the control logic circuit 350.

The memory cell array 310 may include a plurality of memory cells. For example, a plurality of memory cells may be flash memory cells. However, the present disclosure is not limited thereto, and the memory cells may be RRAM (Resistive Random Access Memory) cells, FRAM (Ferroelectric Random Access Memory) cells, PRAM (Phase Change Random Access Memory) cells, TRAM (Thyristor Random Access Memory) cells, and MRAM (Magnetic Random Access Memory) cells. Hereinafter, embodiments of the present disclosure will be described mainly on the basis of an embodiment in which the memory cells are NAND flash memory cells.

The memory controller 200 may include first to eighth pins P21 to P28, and a controller interface circuit 250a. The first to eighth pins P21 to P28 may correspond to the first to eighth pins P11 to P18 of the non-volatile memory 300.

The controller interface circuit 250a may transmit the chip enable signal nCE to the non-volatile memory 300 through a first pin P21. The controller interface circuit 250a may transmit and receive signals to and from the non-volatile memory 300 selected through the chip enable signal nCE, through the second to eighth pins P22 to P28.

The controller interface circuit 250a may transmit the command latch enable signal CLE, the address latch enable signal ALE, and the write enable signal nWE to the non-volatile memory 300 through the second to fourth pins P22 to P24. The controller interface circuit 250a may transmit the data signal DQ to the non-volatile memory 300 or receive the data signal DQ from the non-volatile memory 300 through a seventh pin P27.

The controller interface circuit 250a may transmit the data signal DQ including the command CMD or the address ADDR to the non-volatile memory 300 along with a toggled enable signal nWE. The controller interface circuit 250a may transmit the data signal DQ including the command CMD to the non-volatile memory 300 by transmitting the command latch enable signal CLE having the enable status, and may transmit the data signal DQ including the address ADDR to the non-volatile memory 300 by transmitting the address latch enable signal ALE having the enable status.

The controller interface circuit 250a may transmit the read enable signal nRE to the non-volatile memory 300 through a fifth pin P25. The controller interface circuit 250a may receive the data strobe signal DQS from the non-volatile memory 300 through a sixth pin P26, or may transmit the data strobe signal DQS to the non-volatile memory 300.

In the data DATA output operation of the non-volatile memory 300, the controller interface circuit 250a may create a toggling read enable signal nRE, and may transmit the read enable signal nRE to the non-volatile memory 300. For example, the controller interface circuit 250a may create the read enable signal nRE that changes from the static status (e.g., a high level or a low level) to the toggle status before the data DATA is output. Accordingly, the data strobe signal DQS toggled on the basis of the read enable signal nRE may be created in the non-volatile memory 300. The controller interface circuit 250a may receive the data signal DQ including the data DATA along with the toggling data strobe signal DQS from the non-volatile memory 300. The controller interface circuit 250a may acquire the data DATA from the data signal DQ on the basis of the toggle timing of the data strobe signal DQS.

In the data DATA input operation of the non-volatile memory 300, the controller interface circuit 250a may create the toggling data strobe signal DQS. For example, the controller interface circuit 250a may create a data strobe signal DQS that changes from the static status (e.g., a high level or a low level) to the toggle status before transmitting the data DATA. The controller interface circuit 250a may transmit the data signal DQ including the data DATA to the non-volatile memory 300 on the basis of the toggle timings of the data strobe signal DQS.

The controller interface circuit 250a may receive a ready/busy output signal nR/B from the non-volatile memory 300 through an eighth pin P28. The controller interface circuit 250a may discriminate the status information of the non-volatile memory 300 on the basis of the ready/busy output signal nR/B.

Figure 6:
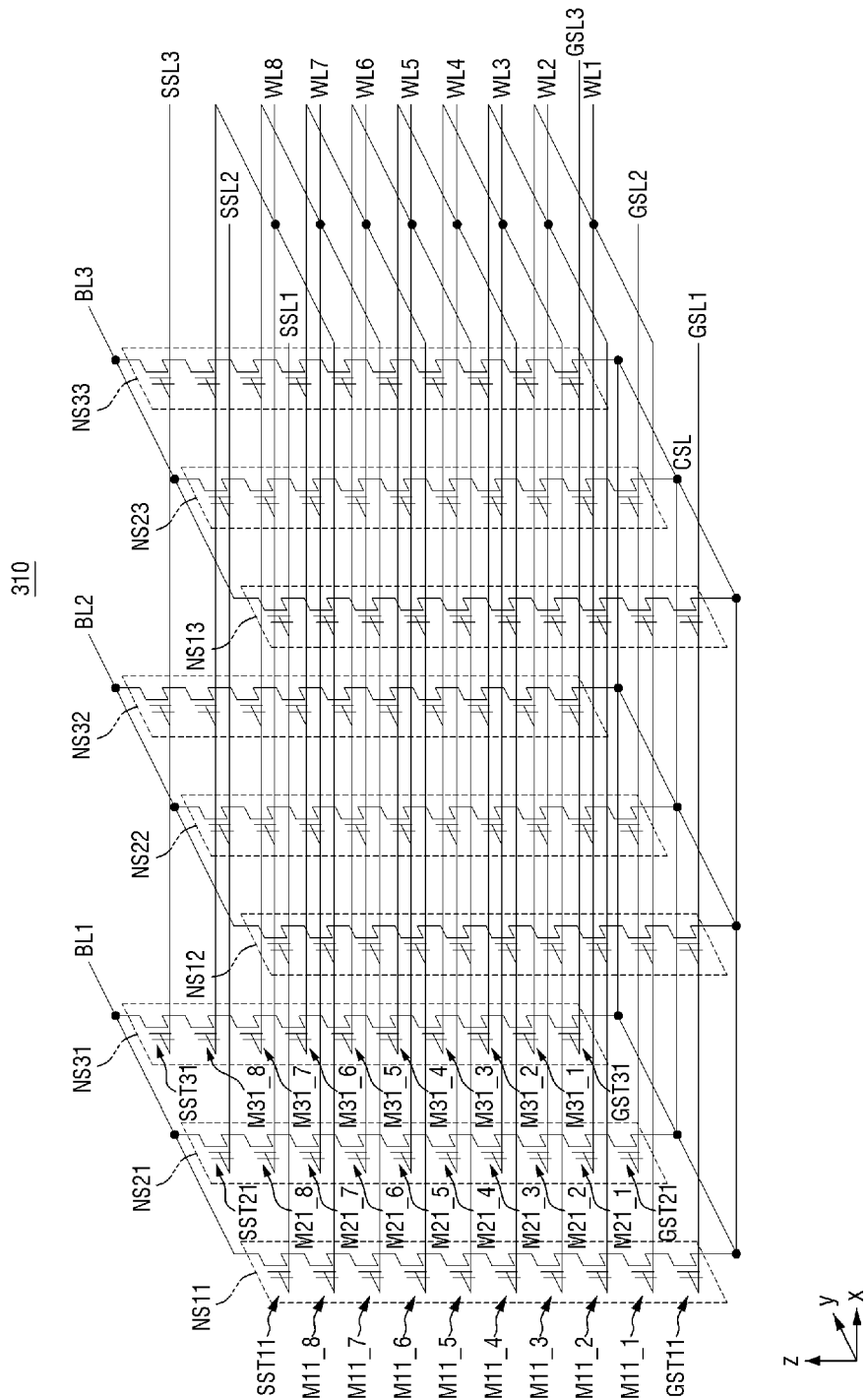
FIG. 6 is an exemplary circuit diagram showing a memory cell array according to some embodiments.

FIG. 6 is an exemplary circuit diagram showing a memory cell array according to some embodiments.

Referring to FIG. 6, plurality of cell strings NS11, NS21, NS31, NS12, NS22, NS32, NS13, NS23, and NS33 may be placed on a substrate (not shown) in a first direction x and a second direction y. The plurality of cell strings NS11, NS21, NS31, NS12, NS22, NS32, NS13, NS23, and NS33 may have a form that extends in a third direction z. The plurality of cell strings NS11, NS21, NS31, NS12, NS22, NS32, NS13, NS23, and NS33 may be connected in common to a common source line CSL formed on or inside a substrate (not shown). A configuration in which the common source line CSL is connected to lowermost ends of the plurality of cell strings NS11, NS21, NS31, NS12, NS22, NS32, NS13, NS23, and NS33 in the third direction z is shown. However, the common source line CSL may be electrically connected to the lowermost ends of the plurality of cell strings NS11, NS21, NS31, NS12, NS22, NS32, NS13, NS23, and NS33 in the third direction z, but the common source line CSL is not limited to a configuration physically located at the lower ends of the plurality of cell strings NS11, NS21, NS31, NS12, NS22, NS32, NS13, NS23, and NS33. Further, although FIG. 6 shows that the plurality of cell strings NS11, NS21, NS31, NS12, NS22, NS32, NS13, NS23, and NS33 are placed in a 3×3 arrangement, the placement form and the number of the plurality of cell strings placed in the memory cell array 310 are not limited thereto.

Some cell strings NS11, NS12, and NS13 may be connected to a first ground select line GSL1. Some cell strings NS21, NS22, and NS23 may be connected to a second ground select line GSL2. Some cell strings NS31, NS32, and NS33 may be connected to a third ground select line GSL3.

Further, some cell strings NS11, NS12, and NS13 may be connected to a first string select line SSL1. Some cell strings NS21, NS22, and NS23 may be connected to a second string select line SSL2. Some cell strings NS31, NS32, and NS33 may be connected to a third string select line SSL3.

Each of the plurality of cell strings NS11, NS21, NS31, NS12, NS22, NS32, NS13, NS23, and NS33 may include a string select transistor SST connected to a respective string select line. In addition, each of the plurality of cell strings NS11, NS21, NS31, NS12, NS22, NS32, NS13, NS23, and NS33 may include a ground select transistor GST connected to a respective ground select line.

First ends of each ground select transistor of the plurality of cell strings NS11, NS21, NS31, NS12, NS22, NS32, NS13, NS23, and NS33 may be connected to the common source line CSL. Also, in each of the plurality of cell strings NS11, NS21, NS31, NS12, NS22, NS32, NS13, NS23, and NS33, a plurality of memory cells may be stacked sequentially in the third direction z, between the ground select transistor and the string select transistor. Although it is not shown in this drawing, each of the plurality of cell strings NS11, NS21, NS31, NS12, NS22, NS32, NS13, NS23, and NS33 may include a dummy cell between the ground select transistor and the string select transistor. Further, the number of string select transistors included in each string is not limited to this drawing.

In one embodiment, the cell string NS11 may include a ground select transistor GST11 placed at the lowermost end in the third direction z, a plurality of memory cells M11_1 to M11_8 stacked sequentially in the third direction z on the ground select transistor GST11, and a string select transistor SST11 stacked in the third direction z on the uppermost memory cell M11_8. Further, the cell string NS21 may include a ground select transistor GST21 placed at the lowermost end in the third direction z, a plurality of memory cells M21_1 to M21_8 stacked sequentially in the third direction z on the ground select transistor GST21, and a string select transistor SST21 stacked in the third direction z on the uppermost memory cell M21_8. Further, the cell string NS31 may include a ground select transistor GST31 placed at the lowermost end in the third direction z, a plurality of memory cells M31_1 to M31_8 stacked sequentially in the third direction z on the ground select transistor GST31, and a string select transistor SST31 stacked in the third direction z on the uppermost memory cell M31_8.

Memory cells located at the same height in the third direction z from the substrate (not shown) or the ground select transistor may be electrically connected in common through respective word lines. For example, the memory cells at a height at which memory cells M11_1, M21_1, and M31_1 are formed may be connected to a first word line WL1. Further, the memory cells at a height at which the memory cells M11_2, M21_2, and M31_2 are formed may be connected to a second word line WL2. Hereinafter, since the placement and structure of the memory cells connected to the third word line WL3 to the eighth word line WL8 are also similar thereto, the description thereof will not be provided.

First ends of each string select transistor of the plurality of cell strings NS11, NS21, NS31, NS12, NS22, NS32, NS13, NS23, and NS33 may be connected to the bit lines BL1, BL2, and BL3. For example, the string select transistors ST11, SST21, and SST31 may be connected to the bit line BL1 that extends in the second direction y. Since explanation of other string select transistors connected to the bit lines BL2 and BL3 is also similar thereto, explanation thereof will not be provided.

The memory cells corresponding to one string (or ground) select line and one word line may form one page. The write operation and the read operation may be performed on in units of each page. Each memory cell on each page may also store two or more bits. The bits written to the memory cells of each page may form logical pages.

The memory cell array 310 may be provided as a three-dimensional memory array. The three-dimensional memory array may be formed monolithically on one or more physical levels of the arrays of the memory cells having an active region placed on a substrate (not shown) and circuits related to the operation of the memory cells. The circuits related to the operation of the memory cells may be located inside or above the substrate. The monolithic formation means that layers of each level of the 3D array may be deposited directly on the layers of the lower level of the 3D array. In some embodiments, a circuit related to the operation of the memory cells may be connected to the uppermost contact portion in the third direction z. This will be described in detail through FIG. 7.

Figure 7:
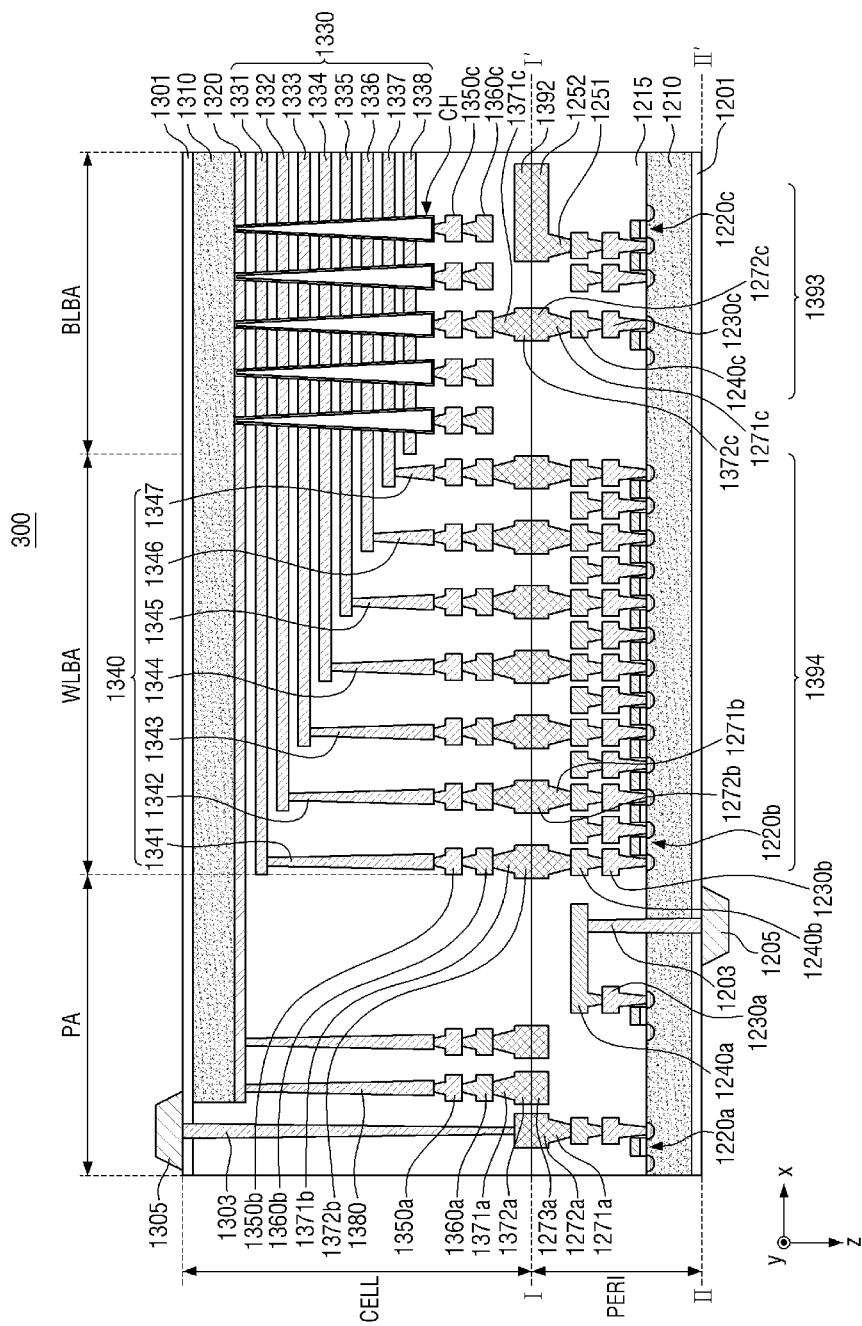
FIG. 7 is an exemplary diagram briefly showing the inside of the non-volatile memory according to some embodiments.

FIG. 7 is an exemplary diagram briefly showing the inside of the non-volatile memory according to some embodiments.

Referring to FIG. 7, the non-volatile memory 300 according to some embodiments may have a C2C (chip to chip) structure. In this drawing, the cell region CELL of the non-volatile memory 300 may correspond to the memory cell array 310 of FIG. 6.

The C2C structure may mean a structure in which an upper chip including the cell region CELL is manufactured on a first wafer, a lower chip including the peripheral circuit region PERI is manufactured on a second wafer different from the first wafer, and then, the upper chip and the lower chip are connected to each other by a bonding path. As an example, the bonding path may mean a path formed by electrically connecting a bonding metal formed on an uppermost metal layer of the upper chip and a bonding metal formed on an uppermost metal layer of the lower chip to each other. For example, when the bonding metal is formed of copper (Cu), the bonding way may be a Cu—Cu bonding path, and the bonding metal may be formed of aluminum or tungsten.

Each of the peripheral circuit region PERI and the cell region CELL of the non-volatile memory 300 according to some embodiments may include an external pad bonding region PA, a word line bonding region WLBA, and a bit line bonding region BLBA.

The peripheral circuit region PERI may include a first substrate 1210, an interlayer insulating layer 1215, a plurality of circuit elements 1220*a*, 1220*b* and 1220*c* formed on the first substrate 1210, first metal layers 1230*a*, 1230*b* and 1230*c* connected to each of the plurality of circuit elements 1220*a*, 1220*b* and 1220*c*, and second metal layers 1240*a*, 1240*b* and 1240*c* formed on the first metal layers 1230*a*, 1230*b* and 1230*c*. In an embodiment, the first metal layers 1230*a*, 1230*b* and 1230*c* may be formed of tungsten which has a relatively high resistance, and the second metal layers 1240*a*, 1240*b* and 1240*c* may be formed of copper which has a relatively low resistance.

Although only the first metal layers 1230*a*, 1230*b* and 1230*c* and the second metal layers 1240*a*, 1240*b* and 1240*c* are shown and explained in the present specification, the present disclosure is not limited thereto, and one or more metal layers may be further formed on the second metal layers 1240*a*, 1240*b* and 1240*c*. At least some of one or more metal layers formed on the second metal layers 1240*a*, 1240*b* and 1240*c* may be formed of aluminum or the like which has a lower resistance than copper which forms the second metal layers 1240*a*, 1240*b* and 1240*c*.

The interlayer insulating layer 1215 is placed on the first substrate 1210 to cover the plurality of circuit elements 1220*a*, 1220*b* and 1220*c*, the first metal layers 1230*a*, 1230*b* and 1230*c*, and the second metal layers 1240*a*, 1240*b* and 1240*c*, and may include an insulating material such as silicon oxide and silicon nitride.

Lower bonding metals 1271*b* and 1272*b* may be formed on the second metal layer 1240*b* of the word line bonding region WLBA. In the word line bonding region WLBA, the lower bonding metals 1271*b* and 1272*b* of the peripheral circuit region PERI may be electrically connected to the upper bonding metals 1371*b* and 1372*b* of the cell region CELL by the bonding path, and the lower bonding metals 1271*b* and 1272*b* and the upper bonding metals 1371*b* and 1372*b* may be formed of aluminum, copper, tungsten, or the like.

The cell region CELL may include at least one memory block. The cell region CELL may include a second substrate 1310 and a common source line 1320 (corresponding to CSL of FIG. 6). A plurality of word lines (1331 to 1338; 1310 which correspond to WL1 to WL8 of FIG. 6) may be stacked on the second substrate 1310 along the third direction z perpendicular to the upper surface of the second substrate 1310. The string select lines and the ground select line may be placed above and below the word lines 1330, and a plurality of word lines 1330 may be placed between the string select lines and the ground select line.

In the bit line bonding region BLBA, the channel structure CH extends in the direction perpendicular to the upper surface of the second substrate 1310 and may penetrate the word lines 1330, the string select lines, and the ground select line. The channel structure CH may include a data storage layer, a channel layer, a buried insulating layer, etc., and the channel layer may be electrically connected to the first metal layer 1350*c* and the second metal layer 1360*c*. For example, the first metal layer 1350*c* may be a bit line contact, and the second metal layer 1360*c* may be a bit line (which corresponds to BL1 to BL3 of FIG. 5) In an embodiment, the bit line 1360*c* may extend along the second direction y parallel to the upper surface of the second substrate 1310.

In an embodiment shown in FIG. 7, the region in which the channel structure CH, the bit line 1360*c* and the like are placed may be defined as a bit line bonding region BLBA. The bit line 1360*c* may be electrically connected to the circuit elements 1220*c* that provide a page buffer 1393 in the peripheral circuit region PERI in the bit line bonding region BLBA. As an example, the bit line 1360*c* is connected to the upper bonding metals 1371*c* and 1372*c* in the peripheral circuit region PERI, and the upper bonding metals 1371*c* and 1372*c* may be connected to the lower bonding metals 1271*c* and 1272*c* connected to the circuit elements 1220*c* of the page buffer 1393.

In the word line bonding region WLBA, the word lines 1330 may extend along the first direction x parallel to the upper surface of the second substrate 1310, and may be connected to a plurality of cell contact plugs (1341 to 1347; 1340). The word lines 1330 and the cell contact plugs 1340 are connected to each other in pads provided by extension of at least some of the word lines 1330 along the first direction x with different lengths. A first metal layer 1350*b* and a second metal layer 1360*b* may be connected sequentially to the top of the cell contact plugs 1340 connected to the word lines 1330. The cell contact plugs 1340 may be connected to the peripheral circuit region PERI through the upper bonding metals 1371*b* and 1372*b* of the cell region CELL and the lower bonding metals 1271*b* and 1272*b* of the peripheral circuit region PERI in the word line bonding region WLBA.

The cell contact plugs 1340 may be electrically connected to the circuit elements 1220*b* that provide a row decoder 1394 in the peripheral circuit region PERI. In an embodiment, the operating voltage of the circuit elements 1220*b* that provide the row decoder 1394 may differ from the operating voltage of the circuit elements 1220*c* that provide the page buffer 1393. As an example, the operating voltage of the circuit elements 1220*c* that provide the page buffer 1393 may be higher than the operating voltage of the circuit elements 1220*b* that provide the row decoder 1394.

A common source line contact plug 1380 may be placed in the external pad bonding region PA. The common source line contact plug 1380 is formed of a conductive material such as metal, metal compound or polysilicon, and may be electrically connected to the common source line 1320. A first metal layer 1350*a* and a second metal layer 1360*a* may be stacked sequentially on the top of the common source line contact plug 1380. As an example, the region in which the common source line contact plug 1380, the first metal layer 1350*a*, and the second metal layer 1360*a* are placed may be defined as an external pad bonding region PA.

On the other hand, I/O pads 1205 and 1305 may be placed in the external pad bonding region PA. Referring to FIG. 7, a lower insulating film 1201 which covers the lower surface of the first substrate 1210 may be formed below the first substrate 1210, and a first I/O pad 1205 may be formed on the lower insulating film 1201. The first I/O pad 1205 is connected to at least one of a plurality of circuit elements 1220*a*, 1220*b* and 1220*c* placed in the peripheral circuit region PERI through the first I/O contact plug 1203, and may be separated from the first substrate 1210 by the lower insulating film 1201. Further, a side insulating film may be placed between the first I/O contact plug 1203 and the first substrate 1210 to electrically separate the first I/O contact plug 1203 and the first substrate 1210 from each other.

Continuously referring to FIG. 7, an upper insulating film 1301 which covers the upper surface of the second substrate 1310 may be formed on the second substrate 1310, and a second I/O pad 1305 may be placed on the upper insulating film 1301. The second I/O pad 1305 may be connected to at least one of the plurality of circuit elements 1220*a*, 1220*b* and 1220c placed in the peripheral circuit region PERI through the second I/O contact plug 1303.

According to some embodiments, the second substrate 1310, the common source line 1320 and the like may not be placed in the region in which the second I/O contact plug 1303 is placed. Also, the second I/O pad 1305 may not overlap the word lines 1380 in the third direction z. Referring to FIG. 7, the second I/O contact plug 1303 is separated from the second substrate 1310 in a direction parallel to the upper surface of the second substrate 1310, penetrates the interlayer insulating layer 1315 of the cell region CELL, and may be connected to the second I/O pad 1305.

According to some embodiments, the first I/O pad 1205 and the second I/O pad 1305 may be selectively formed. As an example, the non-volatile memory 300 according to some embodiments may only include the first I/O pad 1205 placed on the top of the first substrate 1201, or may include only the second I/O pad 1305 placed on the top of the second substrate 1301. Alternatively, the non-volatile memory 300 may include both the first I/O pad 1205 and the second I/O pad 1305.

A metal pattern of the uppermost metal layer may exist as a dummy pattern in each of the external pad bonding region PA and the bit line bonding region BLBA included in each of the cell region CELL and the peripheral circuit region PERI, or the uppermost metal layer may be empty.

The non-volatile memory 300 according to some embodiments may form a lower metal pattern 1273a having the same shape as that of the upper metal pattern 1372a of the cell region CELL on the uppermost metal layer of the peripheral circuit region PERI to correspond to the upper metal pattern 1372a formed on the uppermost metal layer of the cell region CELL, in the external pad bonding region PA. The lower metal pattern 1273a formed on the uppermost metal layer of the peripheral circuit region PERI may not be connected to a separate contact in the peripheral circuit region PERI. Similarly, an upper metal pattern having the same shape as that of the lower metal pattern of the peripheral circuit region PERI may also be formed on the upper metal layer of the cell region CELL to correspond to the lower metal pattern formed on the uppermost metal layer of the peripheral circuit region PERI, in the external pad bonding region PA.

Lower bonding metals 1271b and 1272b may be formed on the second metal layer 1240b of the word line bonding region WLBA. In the word line bonding region WLBA, the lower bonding metals 1271b and 1272b of the peripheral circuit region PERI may be electrically connected to the upper bonding metals 1371b and 1372b of the cell region CELL by the bonding path.

Further, an upper metal pattern 1392 having the same shape as the lower metal pattern 1252 of the peripheral circuit region PERI may be formed on the uppermost metal layer of the cell region CELL to correspond to the lower metal pattern 1252 formed on the uppermost metal layer of the peripheral circuit region PERI, in the bit line bonding region BLBA. The contact may not be formed on the upper metal pattern 1392 formed on the uppermost metal layer of the memory cell region CELL.

Hereinafter, an electronic device 1 including the memory controller 200 that performs a dumping operation will be described referring to FIGS. 8 to 11.

Figure 8:
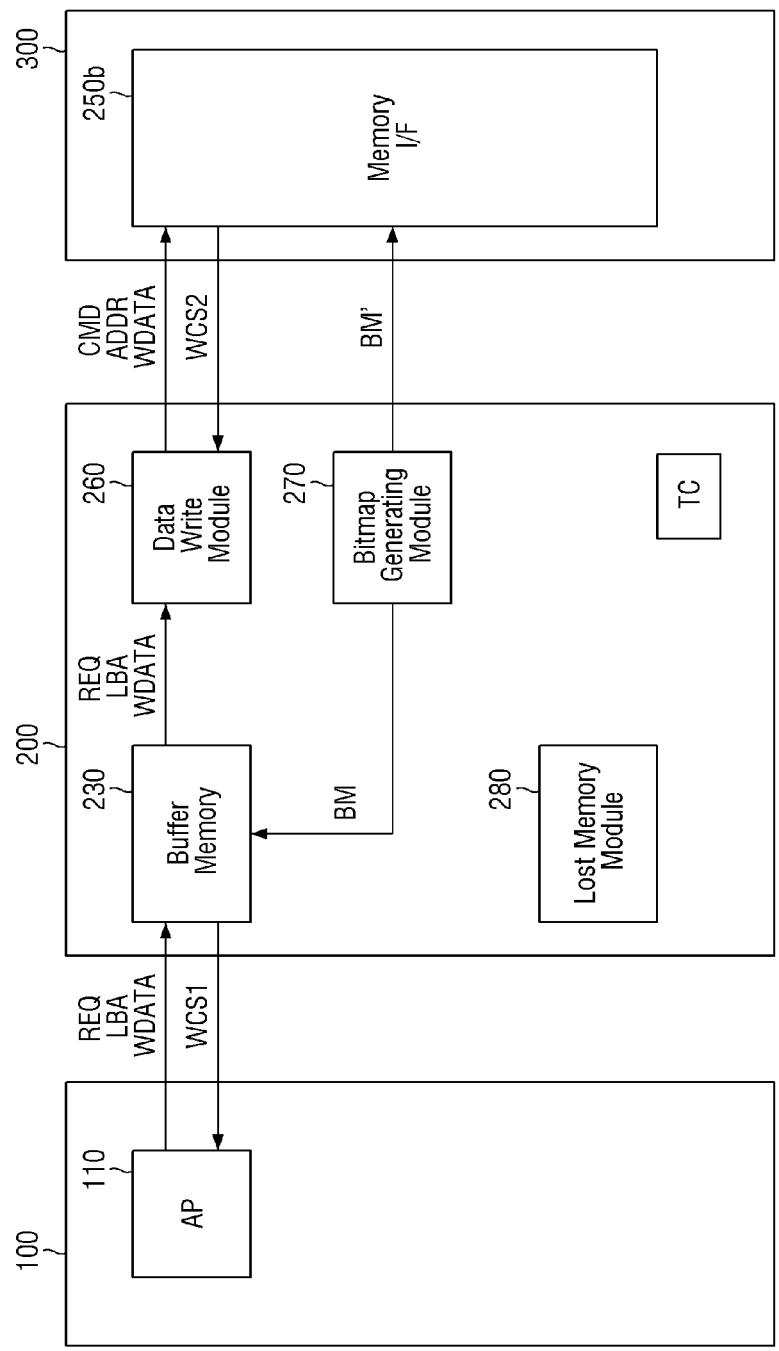
FIG. 8 is a block diagram for explaining the electronic device according to some embodiments.
Figure 9:
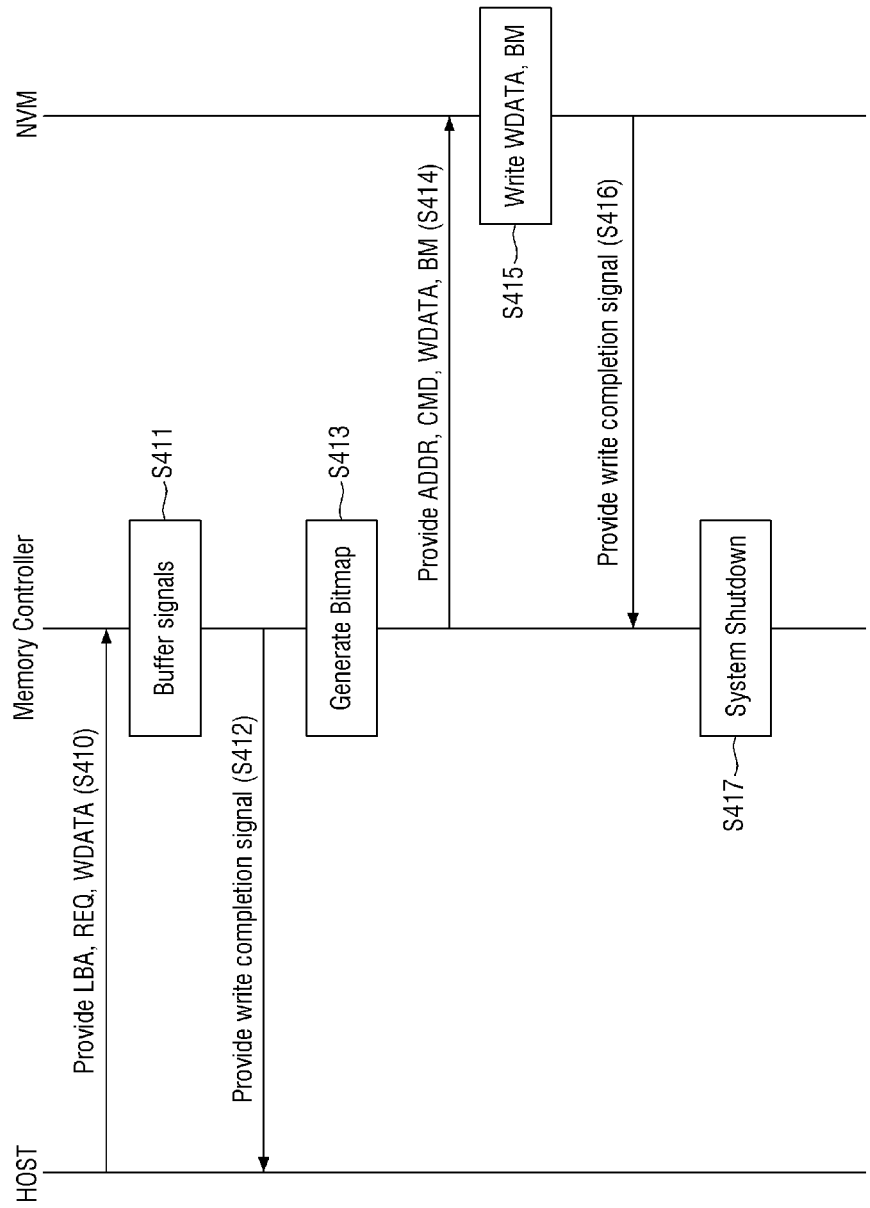
FIG. 9 is a ladder diagram for explaining the operation of the host and the memory storage device according to some embodiments.

FIG. 8 is a block diagram for explaining the electronic device according to some embodiments. FIG. 9 is a ladder diagram for explaining the operation of the host and the memory storage device according to some embodiments.

Figure 10:
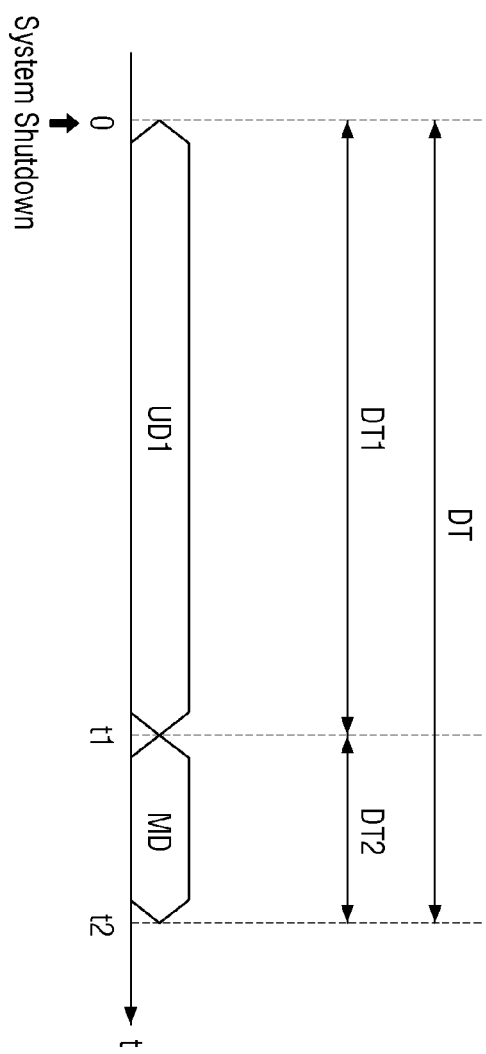
FIGS. 10 and 11 are diagrams for explaining the dumping operation according to some embodiments.
Figure 11:
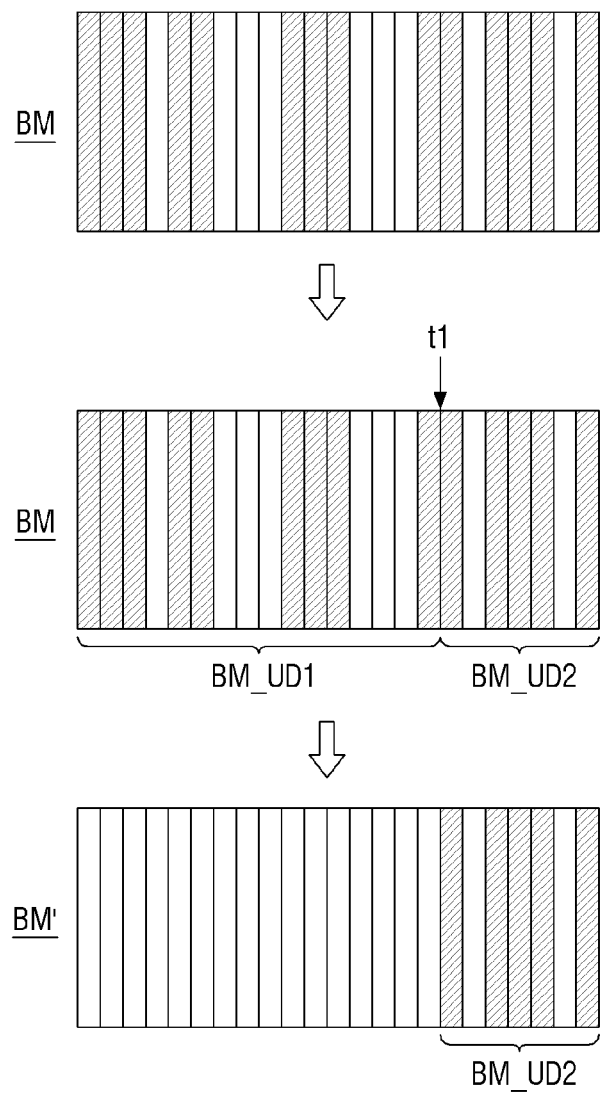

FIGS. 10 and 11 are diagrams for explaining the dumping operation according to some embodiments.

Referring to FIGS. 8 and 9 together, the host 100 may include an application processor 110. The application processor 110, which may be implemented using hardware and firmware and/or software, may control the overall operation of the host 100. The application processor 110 may provide the memory controller 200 with a request signal REQ, a logical block address LBA and a write data WDATA (S410). Here, the request signal REQ may be a write request signal that allows the write data WDATA to be programmed in the memory storage device 10.

The memory controller 200 may include a buffer memory 230, a data write module 260, a bitmap generating module 270, a lost memory module 280, a capacitor TC, and the like. Here, the buffer memory 230 may correspond to the buffer memory 230 shown in FIG. 2. The data write module 260, the bitmap generating module 270, the lost memory module 280, and the like may be embodied by the processor 210 and the working memory 220 shown in FIG. 2, and may be implemented using hardware and firmware and/or software. The modules are not limited to each individual operation. Rather, some of the modules may be combined into a single functional module. The capacitor TC may be connected to the memory controller 200 as a whole, and may provide the stored charge to the configurations of the memory controller 200. For example, when the memory controller 200 is powered off, the memory controller 200 may perform the operation using the electric charge stored in the capacitor TC.

The buffer memory 230 may buffer the signals including the request signal REQ, the logical block address LBA and the write data WDATA received from the host 100 (S411). For example, the buffer memory 230 may buffer the data in a volatile memory such as a DRAM. Accordingly, buffering may be performed by the buffer memory 230 before the write data WDATA is programmed in the non-volatile memory 300. The buffer memory 230 may provide a first write completion signal WCS1 to the application processor 110 in response to the received request signal REQ, logical block address LBA and write data WDATA (S412). Here, the first write completion signal WCS1 may be sent through the host interface 240.

The data write module 260 may include an address mapping table. The data write module 260 may receive the logical block address LBA, the write data WDATA and the request signal REQ from the buffer memory 230. The data write module 260 may control the non-volatile memory 300 so that the write data WDATA is written on the non-volatile memory 300 in response to the request signal REQ.

For example, the data write module 260 may convert the logical block address LBA into the address ADDR on the basis of the address mapping table. Here, the address ADDR may be a physical block address. The address mapping table may be modified by the control of the memory controller 200.

The bitmap generating module 270 may create bitmap BM (S413). For example, the bitmap generating module 270 may create the bitmap BM on the basis of the logical block address LBA or the like sent from the data write module 260. Here, the bitmap BM may be loaded into the buffer memory 230 and may be created to correspond to the logical block address LBA. The bitmap BM loaded into the buffer memory 230 may be deleted when the write data WDATA is programmed in the non-volatile memory 300, and a bitmap BM' corresponding to an address at which the write data WDATA is not programmed may remain undeleted. The bitmap BM' may be provided to the non-volatile memory 300 and programmed. However, the embodiments of the present disclosure is not limited thereto.

The data write module 260 may provide the address ADDR, command CMD, write data WDATA, and bitmap BM' to the non-volatile memory 300 (S414). Here, the command CMD may correspond to the write command. The non-volatile memory 300 may program the write data WDATA or bitmap BM' to a block of the memory cell array 310 corresponding to the address ADDR in response to the command WCMD (S415). However, the embodiments according to the technical ideas of the present disclosure are not limited thereto, and in some embodiments, the non-volatile memory 300 does not program the bitmap BM', when the bitmap BM loaded into the buffer memory 230 is deleted.

Here, the non-volatile memory 300 provided with the address ADDR, command CMD and write data WDATA may provide the memory controller 200 with a second write completion signal WCS2 in response to initiating programming of the non-volatile memory 300 (S416). For example, in some embodiments, even before the program for the write data WDATA is completed (but after the address ADDR, command CMD, write data WDATA are received), the second write completion signal WCS2 may be sent to the memory controller 200.

A system shutdown may occur on the memory controller S417 (S417). The system shutdown means that the power supplied to the memory storage device 10 is turned off. For example, if the power supply is suddenly turned off, the system shutdown may correspond to SPO (sudden power off). Although FIG. 9 shows that the system shutdown occurs after step S416, the system shutdown may occur while step S414 or step S415 is in progress. At this time, the memory controller 200 may dump the data buffered in the buffer memory 230, using the electric charge stored in the capacitor TC. That is, the dumping operation of the memory controller 200 may be performed, while the electric charge stored in the capacitor TC is exhausted after the system shutdown occurs. The dumping refers to storing the data buffered in the buffer memory 230 to the non-volatile memory 300.

A detailed description of the lost memory module 280 will be given later.

Referring to FIGS. 10 and 11, the system shutdown may occur at 0 seconds. The time during which the electric charge stored in the capacitor TC is exhausted after the system shutdown may be a dumping time DT. Here, the dumping time DT may be t2 seconds. The memory controller 200 may classify the bitmap BM into a user bitmap BM_UD1 and a user bitmap BM_UD2. Here, the user bitmap BM_UD1 may correspond to a bitmap whose write data WDATA to be programmed is important, and the user bitmap BM_UD2 may correspond to a bitmap that is less important than the write data WDATA corresponding to the user bitmap BM_UD1. Both user bitmaps BM_UD1 and BM_UD2 may already be stored in the non-volatile memory 300, but the user data corresponding to the bitmaps may not yet be stored in the non-volatile memory 300. Alternatively, as an initial step after an SPO, the current (e.g., most recently updated) bitmap BM may be stored first in the non-volatile memory 300 before any user data. The user data UD1 corresponding to the user bitmap BM_UD1 may be programmed during the first dumping time DT1 corresponding to 0 seconds to t1 seconds. Accordingly, the user bitmap BM_UD1 may be deleted from the buffer memory 230. Here, metadata MD that is prioritized to not be lost, or that must not be lost, may constitute the write data WDATA corresponding to the user bitmap BM_UD1.

The metadata MD may be programmed in the non-volatile memory 300 during a second dumping time DT2 subsequent to the first dumping time DT1. Here, the second dumping time DT2 may correspond to t1 seconds to t2 seconds. The user bitmap BM_UD2, which was stored in the non-volatile memory 300, may correspond to the bitmap BM' that remains in the buffer memory 230. The user data that corresponds to the user bitmap BM_UD2 may not be programmed in the non-volatile memory 300 during the dumping time DT. For example, the user bitmap BM_UD2 may correspond to a page that is not programmed during the first dumping time DT1 or the second time DT2. According to the above steps, even when the system shutdown occurs, the non-volatile memory 300 may store the user data UD1 and may also store the bitmap BM'. Further, when a system shutdown occurs, all the data loaded into the buffer memory 230 corresponding to the volatile memory may disappear and become extinct.

Figure 12:
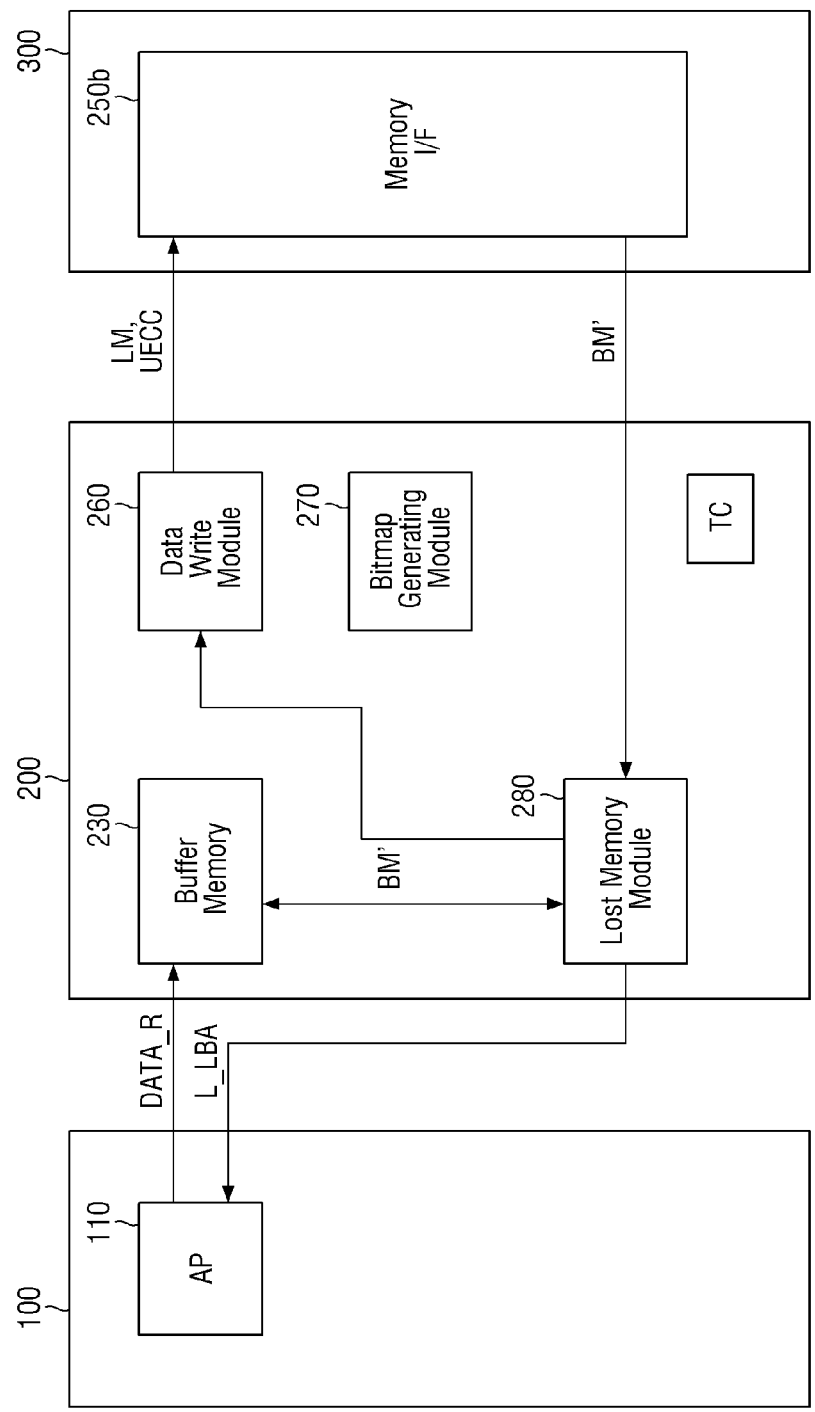
FIG. 12 is a block diagram for explaining an electronic device according to some embodiments.
Figure 13:
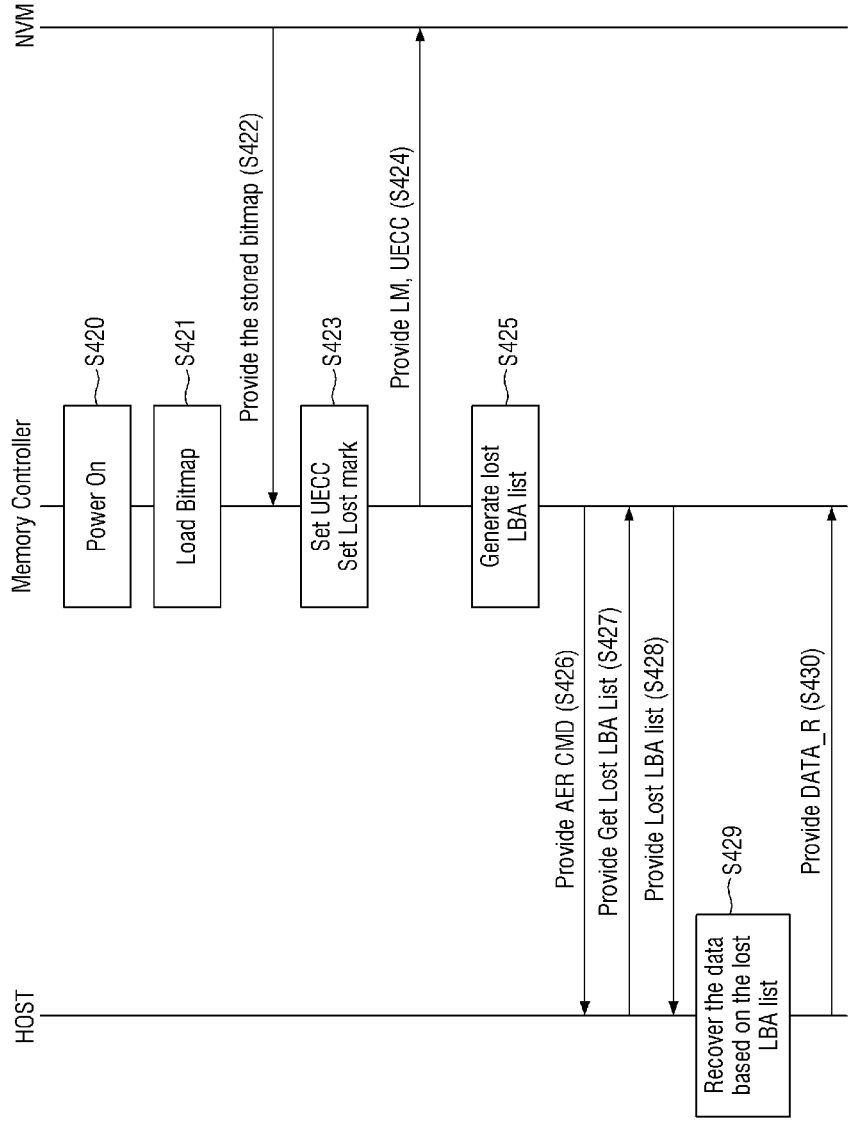
FIG. 13 is a ladder diagram for explaining the operation of the host and the memory storage device according to some embodiments.

FIG. 12 is a block diagram for explaining an electronic device according to some embodiments. FIG. 13 is a ladder diagram for explaining the operation of the host and the memory storage device according to some embodiments. FIGS. 14 to 17 are diagrams for explaining the operation of the host and the memory storage device of FIGS. 12 and 13.

Referring to FIGS. 12 and 13, the memory storage device 10 may be powered on (S420). In powering on the memory storage device 10, the memory controller 200 may be powered on. Here, the memory storage device 10 corresponds to power-on after the system shutdown occurs.

Figure 14:
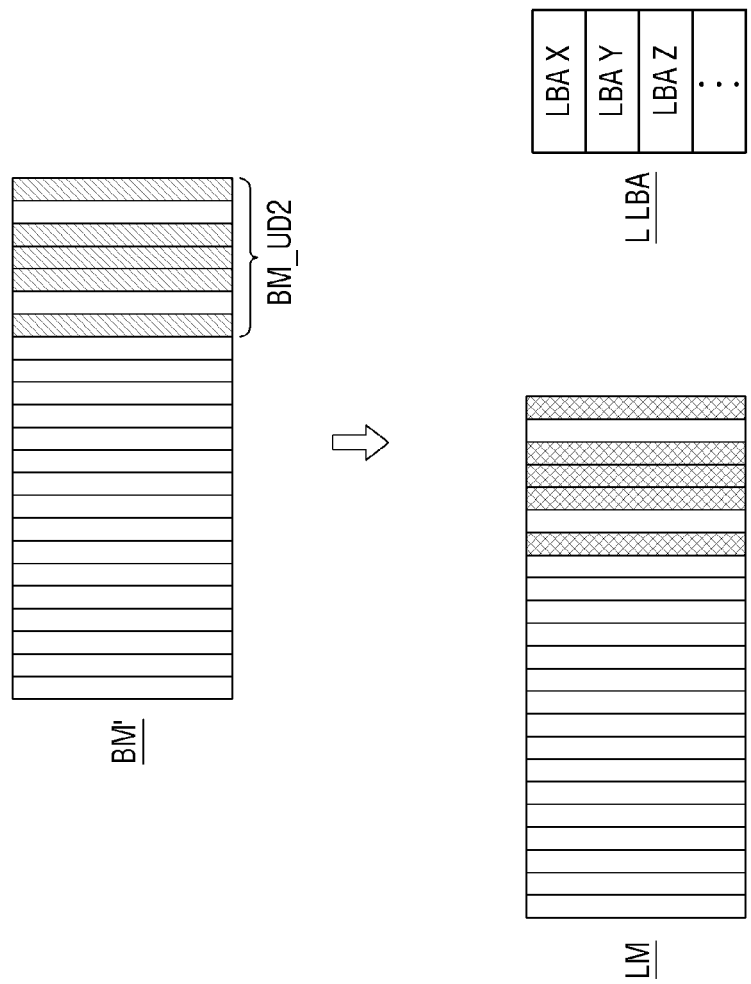

The memory controller 200 may load the bitmap BM' from the non-volatile memory 300 (S421), and the non-volatile memory 300 may provide the stored bitmap BM' to the memory controller 200 (S422). The lost memory module 280 of the memory controller 200, also described as a loss-and-recovery memory module, may receive the bitmap BM'. Further, the memory controller 200 may load the bitmap BM' into the buffer memory 230. Referring to FIG. 14, the bitmap BM' may include the user bitmap BM_UD2. Here, the page recorded in the bitmap BM' may correspond to a lost page (e.g., an address that was not programmed according to the logical block address to physical block address mapping stored in the FTL or address table).

Referring to FIGS. 12 to 14, the memory controller 200 may provide a lost mark LM to the non-volatile memory 300 and perform UECC processing on the basis of the bitmap BM' (S424). For example, the lost memory module 280 may process a page as an uncorrectable page, e.g., due to a UECC (uncorrectable error correction code), on the basis of the bitmap BM'. For example, the page corresponding to the user bitmap BM_UD2 of the bitmap BM' may be determined to be uncorrectable using ECC. In this case, if the read command for that page is provided to the non-volatile memory 300, a signal indicating that page is uncorrectable may be provided as a response. The loss and recovery memory module 280 may perform loss and recovery processing on that page on the basis of the bitmap BM'. For example, the loss and recovery memory module 280 may set a flag indicating that the page (e.g., physical block address) corresponding to the user bitmap BM_UD2 of the bitmap BM' is unusable, or lost. The flag may be described as a "lost mark LM." The lost mark LM may be stored in a spare region of the non-volatile memory 300. This spare region may be checked prior to a read operation. Accordingly, even if a read command is received for a read operation on that page of the memory storage device 10, the data may not be read. Reliability of the memory storage device 10 can be improved accordingly.

For data recovery, the memory controller 200 may create a lost LBA list (L_LBA) (S425). Here, the lost LBA list (L_LBA) may include information on the lost LBA. Although the lost LBA list (L_LBA) may include information about an LBA that is lost due to system shutdown, the embodiment of the present disclosure is not limited thereto. The lost LBA list (L_LBA) may include a plurality of LBAs. For example, the LBAs corresponding to the page or pages indicated in the bitmap BM' may be included in the lost LBA list (L_LBA).

The memory controller 200 may provide an AER command (Asynchronous Event Response command) (AER CMD) to the host 100 after the lost LBA list (L_LBA) is created. The memory controller 200 may provide the AER command (AER CMD) to the host 100, even if the lost LBA list (L_LBA) is not created. The AER command (AER CMD) may be sent through the host interface 240.

Referring to FIG. 15, the AER command (AER CMD) provided from the memory controller 200 to the host 100 may include whether a lost LBA list (L_LBA) is created. In some embodiments, if a partial value of the AER command (AER CMD) is 04, the AER command (AER CMD) may include information indicating that the lost LBA list (L_LBA) was created by the system shutdown. In another embodiment, if a partial value of the AER command (AER CMD) is 05, the AER command (AER CMD) may include information indicating that the previous lost LBA list (L_LBA) was deleted by the system shutdown. For example, this may correspond to a case where the previous lost LBA list (L_LBA) was not sent because there are two system shutdowns. In another embodiment, if a partial value of the AER command (AER CMD) is 06, the AER command (AER CMD) may include both information indicating that the lost LBA list (L_LBA) was created by the system shutdown and information indicating that the previous lost LBA list (L_LBA) was deleted by the system shutdown. However, the embodiments of the present disclosure is not limited thereto, and the information of the AER command (AER CMD) may differ from that described above.

Referring to FIGS. 12 and 13 again, the host 100 may provide the memory controller 200 with a command for requesting the lost LBA information of the memory storage device 10. For example, the host 100 may provide the memory controller 200 with a Get Lost LBA List command (S427). Here, the host 100 may provide a command for requesting the lost LBA information from the memory storage device 10 in response to the AER command (AER CMD) provided from the memory controller 200 (e.g., an AER command indicating that the lost LBA list was created). Further, the command for requesting the lost LBA information may correspond to the command for requesting the lost LBA information due to the system shutdown of the memory storage device 10. However, the embodiments of the present disclosure are not limited thereto.

Referring to FIG. 16, the command for requesting the lost LBA information from the memory storage device 10 may include the Get Log Page command. Here, a log identifier of the Get Log Page command may be one of C0 to FF. Since the host 100 designates the log identifier to one of C0 to FF and provides the Get Log Page command to the memory storage device 10, the host 100 may ask the memory storage device 10 for the lost LBA information of the memory storage device 10.

Here, the Get Lost LBA List command may be included in the Get Log Page command. For example, the log identifier of the Get Lost LBA List command may be one of C0 to FF. That is, the host 100 may request the lost LBA information of the memory storage device 10, by designating the log identifier as one of C0 to FF and providing the memory storage device 10 with the Get Lost LBA List command.

Referring to FIGS. 12 and 13 again, the memory controller 200 may provide the lost LBA information to the host 100 in response to the command for requesting the lost LBA information. That is, the memory controller 200 may provide the lost LBA list (L_LBA) to the host 100 (S428).

Referring to FIG. 17, the lost LBA list (L_LBA) provided to the host 100 may include various pieces of information. For example, the lost LBA list (L_LBA) may include the number of lost LBAs, the lost LBA list, deletion of the lost previous LBA list, and the like. Here, the embodiment of the present disclosure is not limited thereto, and the lost LBA list (L_LBA) may include the number of LBAs lost due to system shutdown, the LBA list lost due to system shutdown, and deletion of the previous LBA list lost due to system shutdown.

Referring to FIGS. 12 and 13 again, the host 100 may recover the data on the basis of the received lost LBA list (L_LBA) (S429). Because the lost LBA list (L_LBA) is created on the basis of the bitmap BM' and include the lost LBAs, the data of the LBAs may be recovered. For example, if the host 100 includes replica data, etc., the data may be recovered on the basis of the corresponding lost LBA list (L_LBA). Accordingly, recovery data DATA_R may be created.

The host 100 may provide the recovery data DATA_R to the memory controller 200 (S430). The memory controller 200 may recover the lost data, using the recovery data DATA_R. For example, the FTL or an address table may be updated to include new physical block addresses mapped to the lost LBAs, and the lost data may be stored in the new physical block addresses. Reliability of the memory storage device 10 can be further improved accordingly.

Hereinafter, an electronic device 1 including a host 100 that performs the read operation will be described referring to FIGS. 18 to 20.

Figure 18:
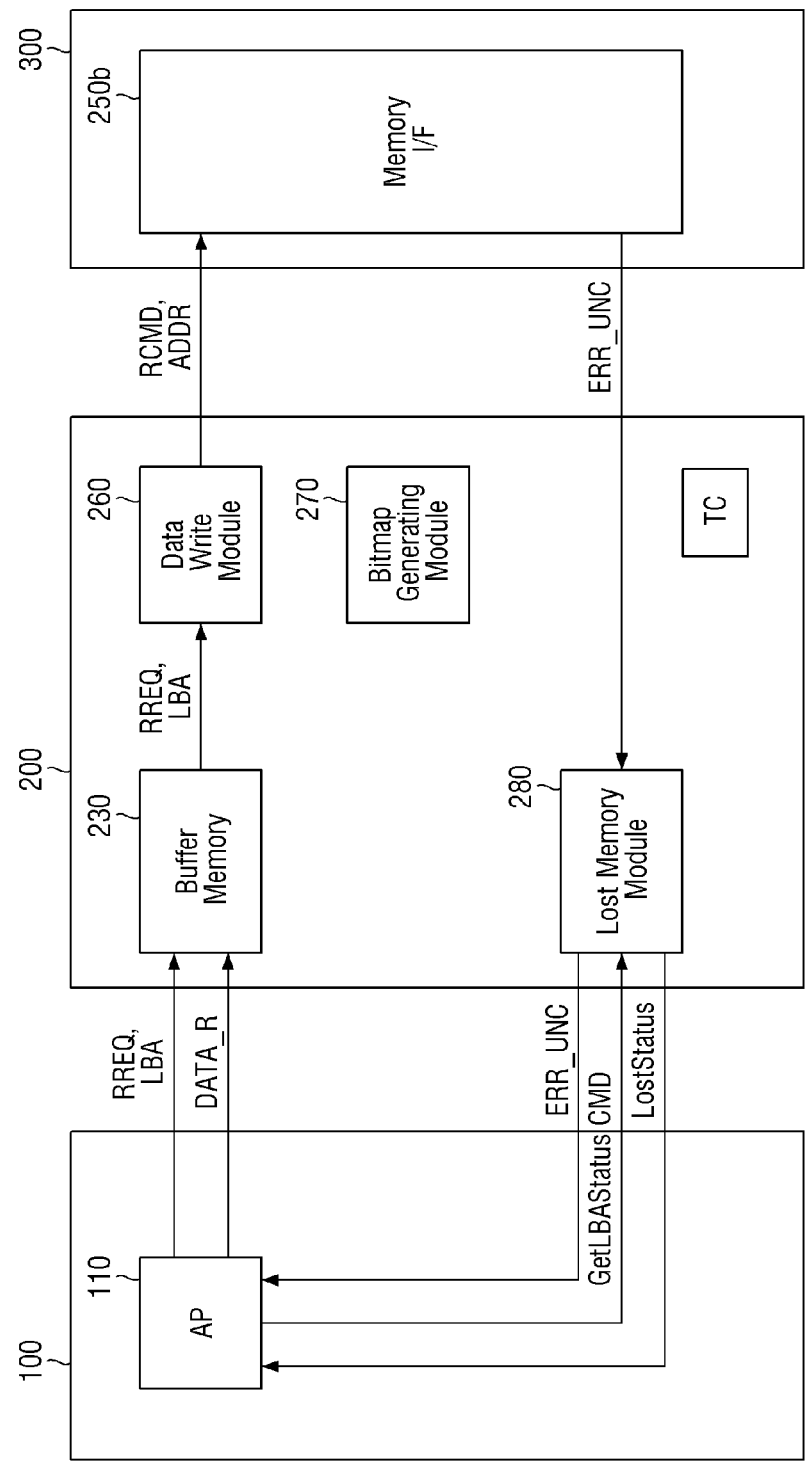
FIG. 18 is a block diagram for explaining the electronic device according to some embodiments.

FIG. 18 is a block diagram for explaining the electronic device according to some embodiments. FIG. 19 is a ladder diagram for explaining the operation of the host and the memory storage device according to some embodiments. FIG. 20 is a diagram for explaining the operation of the host and the memory storage device of FIGS. 18 and 19. For convenience of explanation, repeated parts of contents explained using FIGS. 1 to 17 will be briefly described or omitted.

Figure 19:
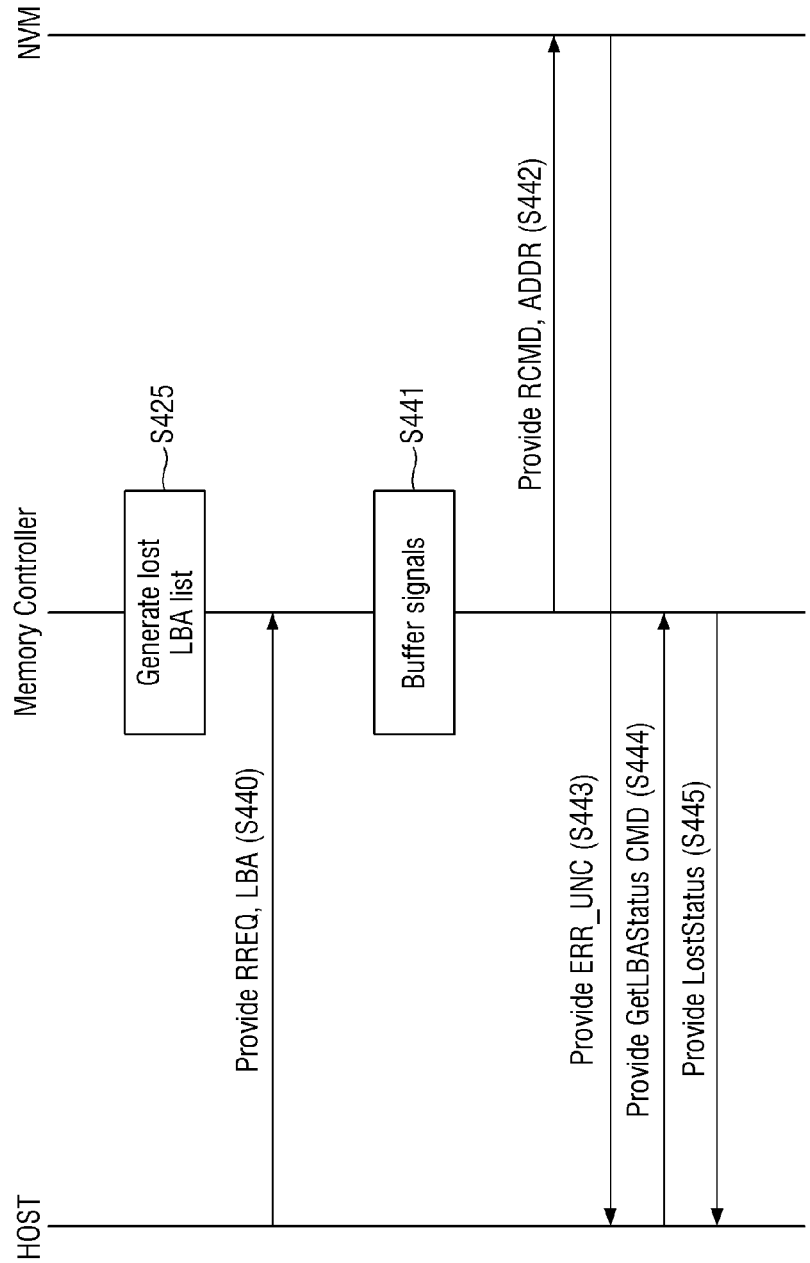
FIG. 19 is a ladder diagram for explaining the operation of the host and the memory storage device according to some embodiments.

Referring to FIGS. 18 and 19, the memory controller 200 may create a lost LBA list (L_LBA) (S425). Here, the operation corresponds to the generation of the lost LBA list (L_LBA) described referring to FIGS. 1 to 17. That is, the lost LBA list may be created by the system shutdown. Unlike those described referring to FIGS. 1 to 17, before the lost LBA list (L_LBA) is provided to the host 100, the host 100 may provide the memory storage device 10 with the read request signal RREQ and LBA (S440). The memory controller 200 may buffer the signal (S441) and provide the corresponding read command RCMD and address ADDR to the non-volatile memory 300 (S442).

Here, the non-volatile memory 300 may be subjected to UECC processing and loss and recovery processing by the memory controller 200. For example, as described referring to FIG. 13, the memory controller 200 may perform UECC processing and loss and recovery processing on that page. Therefore, the memory storage device 10 may provide an uncorrectable error signal ERR_UNC to the host 100 in response to the read request signal RREQ (S443). Here, the uncorrectable error signal ERR_UNC may indicate a status in which that page cannot be read.

The host 100 may provide the command for requesting the LBA status information in response to the uncorrectable error signal ERR_UNC. For example, the host 100 may provide the Get LBA Status command to the memory storage device 10 (S444). The memory storage device 10 may provide lost status information due to system shutdown in response to the Get LBA Status command. For example, the memory storage device 10 may provide the Lost Status to the host 100 in response to the Get LBA Status command (S445). Referring to FIG. 20, if a partial value of the LBA Status provided from the memory storage device 10 to the host 100 is 03, the response may include the lost status information due to the system shutdown. That is, the host 100 is provided with the Lost Status and may check that the page of the memory storage device 10 is in the lost status. Reliability of the electronic device 1 including the memory storage device 10 and the host 100 can be further improved accordingly.

Hereinafter, the electronic device 1 including the host 100 that performs a recovery operation will be described referring to FIG. 21.

Figure 21:
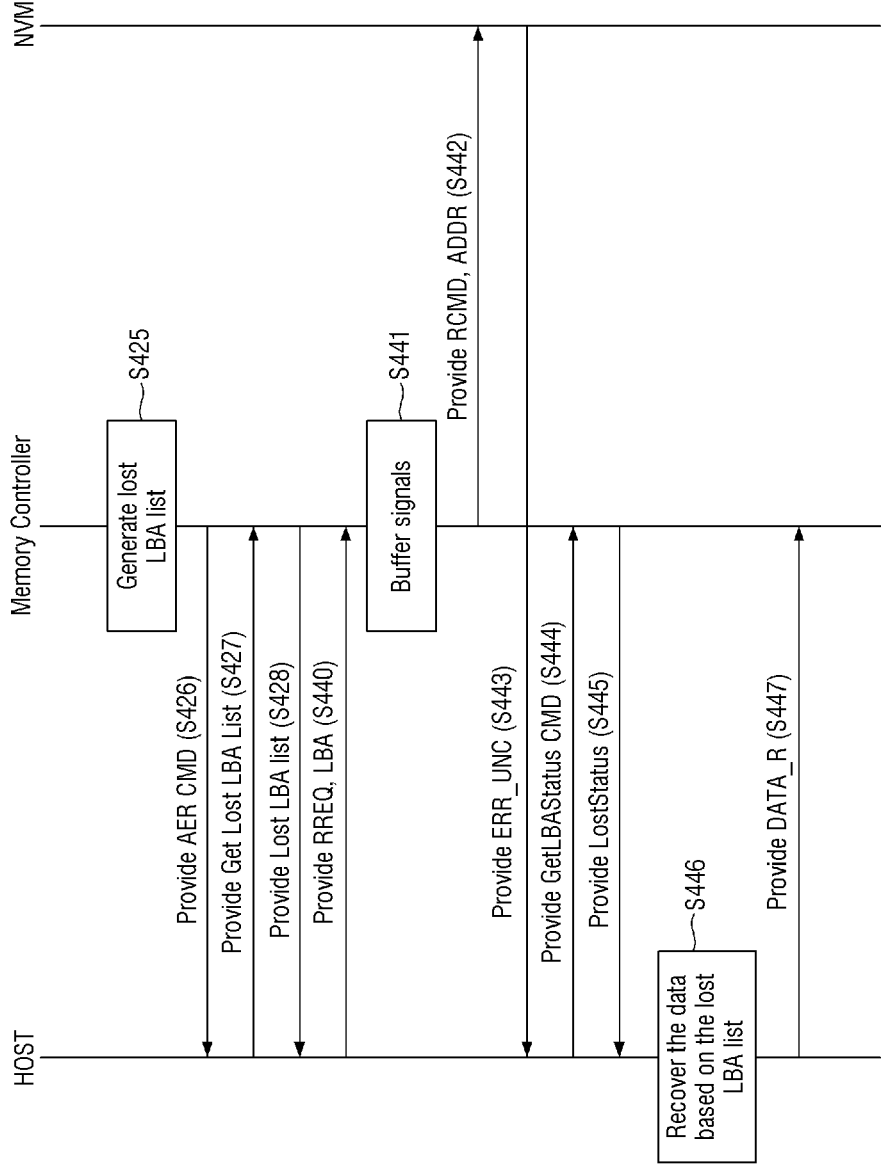
FIG. 21 is a ladder diagram for explaining the operation of the host and the memory storage device according to some embodiments.

FIG. 21 is a ladder diagram for explaining the operation of the host and the memory storage device according to some embodiments. For convenience of explanation, repeated parts of contents explained using FIGS. 1 to 20 will be briefly explained or omitted.

Referring to FIG. 21, the memory controller 200 may create a lost LBA list (L_LBA) (S425). Also, the host 100 may receive the lost LBA list (L_LBA) by sending and receiving signals between the memory controller 200 and the host 100. The host 100 may then provide the memory storage device 10 with the read request signal RREQ and LBA (S440). As described referring to FIGS. 18 to 20, the host 100 may recover data based on the Lost Status in response to the Get LBA Status command (S445).

The host 100 may receive the lost status information due to the system shutdown and may recover the data on the basis of the lost LBA list (L_LBA) when there is a lost status (S446). That is, the host 100 may recover the data by utilizing the existing lost LBA list (L_LBA) provided. Subsequently, the host 100 may provide the recovery data DATA_R to the memory storage device 10 (S447). The memory controller 200 may recover the lost data, using the recovery data DATA_R. Reliability of the memory storage device 10 can be further improved accordingly.

Hereinafter, an electronic device 2 including a plurality of non-volatile memories 301, 302 and 303 will be described referring to FIG. 22.

Figure 22:
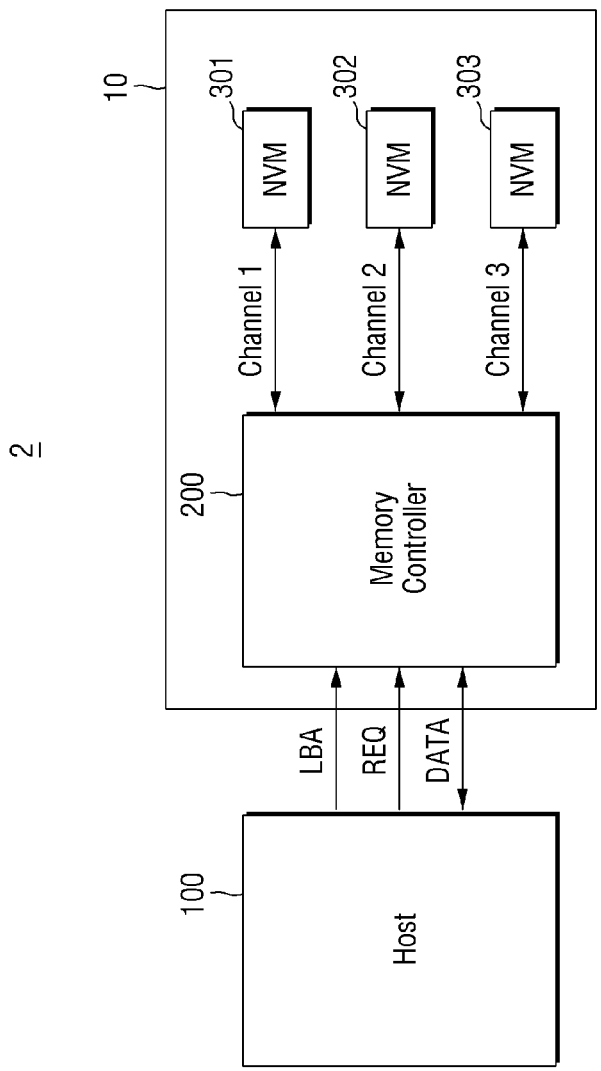
FIG. 22 is a block diagram for explaining the electronic device according to some embodiments.

FIG. 22 is a block diagram for explaining the electronic device according to some embodiments. For convenience of explanation, repeated parts of contents explained using FIGS. 1 to 21 will be briefly described or omitted.

Referring to FIG. 22, the memory storage device 10 may include a plurality of non-volatile memories 301, 302 and 303 connected to the memory controller 200.

Each of the non-volatile memories 301, 302 and 303 may be substantially the same as the non-volatile memory 300 described referring to FIGS. 1 to 21. For example, each of the non-volatile memories 301, 302 and 303 may include a memory cell array 310, an address decoder 320, a voltage generator 330, a read/write circuit 340, a control logic 350 and the like.

The memory controller 200 and the non-volatile memory 301 may be connected through a first channel (Channel 1). The memory controller 200 and the non-volatile memory 302 may be connected through a second channel (Channel 2). The memory controller 200 and the non-volatile memory 303 may be connected through a third channel (Channel 3).

The operating operation of the host 100 and the memory storage device 10 described referring to FIGS. 1 to 21 may be performed by the electronic device 2.

In concluding the detailed description, those skilled in the art will appreciate that many variations and modifications may be made to the disclosed embodiments without substantially departing from the principles of the present disclosure. Therefore, the disclosed embodiments of the invention are used in a generic and descriptive sense only and not for purposes of limitation.

What is claimed is:

1. A method for a memory storage device, the memory storage device comprising:
 a memory controller; and
 a non-volatile memory connected to the memory controller, the method comprising:
 receiving, by the memory controller, a command from a host device, the command requesting information about lost LBAs (logical block addresses) lost from a buffer of the memory controller during a system shutdown of the memory storage device,
 in response to the command, providing, by the memory controller, the information about the lost LBAs, and
 receiving, by the memory controller, recovered data corresponding to the lost LBAs based on the information about the lost LBAs,
 wherein the information about the lost LBAs includes at least one of the number of LBAs lost by system shutdown, an LBA list lost by system shutdown, and deletion of a previous LBA list lost by system shutdown,
 wherein:
 the memory controller receives and buffers write data and LBAs from the host device prior to the system shutdown,
 the memory controller creates and stores a bitmap on the basis of the buffered write data and LBAs prior to the system shutdown, and
 the memory controller programs the bitmap and at least some of the buffered write data into the non-volatile memory on the basis of the LBAs during a dumping time due to the system shutdown, the dumping time lasting from the time of system shutdown to a time when a temporary power source is exhausted.

2. The method of claim 1, wherein the command requesting the information about the lost LBAs includes Get Log Page command provided from the host device.

3. The method of claim 2, wherein a log identifier of the Get Log Page command is one of C0 to FF.

4. The method of claim 2, wherein the Get Log Page command is a Get Lost LBA List command.

5. The method of claim 1, wherein:
 the memory controller loads the programmed bitmap from the non-volatile memory, and
 the memory controller indicates a lost page in the non-volatile memory on the basis of the loaded bitmap.

6. The method of claim 5, wherein the memory controller creates the information about the lost LBAs on the basis of the loaded bitmap.

7. The method of claim 1, wherein:
the memory controller receives a read request signal from the host device,
the memory controller transmits an uncorrectable error signal in response to the read request signal,
the memory controller receives a command for requesting LBA status information from the host device, and
the memory controller provides lost status information due to system shutdown in response to the command for requesting the LBA status information.

8. The method of claim 7, wherein the memory controller receives recovered data as a result of providing the lost status information.

9. A method for operating a host device, the method comprising:
transmitting a command to a memory storage device, the command for requesting information about lost LBAs, the lost LBAs lost from a volatile memory of a memory controller of the memory storage device after a dumping time in which some LBAs are written from the volatile memory to a nonvolatile memory of the memory storage device as a result of a system shutdown of the memory storage device;
receiving the information about the lost LBAs from the memory storage device in response to the command;
generating recovery data on the basis of the information about the lost LBAs received from the memory storage device; and
providing the recovery data to the memory storage device, wherein the recovery data includes data from the host device corresponding to the lost LBAs.

10. The method of claim 9, wherein the command for requesting the lost LBA information from the memory storage device includes a Get Log Page command.

11. The method of claim 10, wherein the Get Log Page command is a Get Lost LBA List command.

12. A method for operating a memory storage device, the method comprising:
transmitting from the memory storage device an AER command (Asynchronous Event Request command) indicating whether lost LBA information resulting from system shutdown of the memory storage device has been created, and which causes a host to send a command requesting lost LBA information; and
receiving the command requesting to retrieve the lost LBA information from the memory storage device, in response to the command requesting the lost LBA information.

13. The method of claim 12, wherein the lost LBA information is provided in response to the command requesting to retrieve the lost LBA information from the memory storage device.

14. The method of claim 13, wherein recovered data is received corresponding to the lost LBA information.

15. The method of claim 12, wherein the AER command further includes whether previous lost LBA information has been deleted by system shutdown.

16. The method of claim 12, wherein the AER command is transmitted when the lost LBA information has been created by the system shutdown.

* * * * *